(12) United States Patent
Jackson, Jr. et al.

(10) Patent No.: US 10,197,126 B2
(45) Date of Patent: Feb. 5, 2019

(54) GAS SPRING END MEMBERS AS WELL AS GAS SPRING ASSEMBLIES, SUSPENSION SYSTEMS AND METHODS

(71) Applicant: Firestone Industrial Products Company, LLC, Indianapolis, IN (US)

(72) Inventors: David D. Jackson, Jr., Noblesville, IN (US); Jeremy M. Wiedmann, Fishers, IN (US); Matthew F. Byron, Indianapolis, IN (US)

(73) Assignee: Firestone Industrial Products Company, LLC, Nashville, TN (US)

( * ) Notice: Subject to any disclaimer, the term of this patent is extended or adjusted under 35 U.S.C. 154(b) by 0 days.

(21) Appl. No.: 15/492,834

(22) Filed: Apr. 20, 2017

(65) Prior Publication Data

US 2017/0307043 A1 Oct. 26, 2017

Related U.S. Application Data

(60) Provisional application No. 62/325,841, filed on Apr. 21, 2016.

(51) Int. Cl.
*F16F 9/04* (2006.01)
*F16F 9/05* (2006.01)
(Continued)

(52) U.S. Cl.
CPC .......... *F16F 9/0454* (2013.01); *B60G 11/28* (2013.01); *B61F 5/10* (2013.01); *F16F 9/05* (2013.01);
(Continued)

(58) Field of Classification Search
CPC ........... F16F 9/05; F16F 9/0454; B60G 11/27; B61F 5/307
See application file for complete search history.

(56) References Cited

U.S. PATENT DOCUMENTS 9,388,876 B2 * 7/2016 Trowbridge ........... B60G 11/27
2012/0200020 A1 * 8/2012 Peeters .................. B60G 11/27
267/122
(Continued)

FOREIGN PATENT DOCUMENTS

EP 0295392 12/1988
EP 2775162 9/2014
WO WO 2013/181282 12/2013

OTHER PUBLICATIONS

European Search Report for corresponding Patent Application No. 17167369 dated Sep. 27, 2017.

*Primary Examiner* — Vishal R Sahni
(74) *Attorney, Agent, or Firm* — Brian D. McAlhaney; Fay Sharpe LLP

(57) ABSTRACT

Gas spring end members can include an end member body formed substantially entirely from a polymeric material. The end member body can have a longitudinal axis and can include a body wall with an end wall portion oriented transverse to the longitudinal axis. The end wall portion can at least partially define a mounting plane of the gas spring end member that is dimensioned to abuttingly engage an associated structural component. The body wall can also include an outer peripheral wall portion disposed radially outward of the end wall portion and that at least partially defines an outer peripheral edge of the gas spring end member. The outer peripheral wall portion can be axially offset from the end wall portion in a direction away from the mounting plane. Gas spring assemblies, suspension systems and methods are also included.

20 Claims, 23 Drawing Sheets

(51) Int. Cl.
*B60G 11/28* (2006.01)
*B61F 5/10* (2006.01)
B60G 11/27 (2006.01)
B61F 5/30 (2006.01)

(52) U.S. Cl.
CPC ........ *B60G 11/27* (2013.01); *B60G 2202/152* (2013.01); *B60G 2206/424* (2013.01); *B60G 2206/91* (2013.01); *B60G 2300/10* (2013.01); *B61F 5/307* (2013.01)

(56) References Cited

U.S. PATENT DOCUMENTS

2014/0061983 A1* 3/2014 DeBruler ................ F16F 9/05
 267/64.27
2016/0169315 A1* 6/2016 DeBruler .............. F16F 9/0463
 267/64.27

\* cited by examiner

GAS SPRING END MEMBERS AS WELL AS GAS SPRING ASSEMBLIES, SUSPENSION SYSTEMS AND METHODS

This application claims priority from U.S. Provisional Patent Application No. 62/325,841, filed on Apr. 21, 2016, the entire disclosure of which is hereby incorporated by reference herein.

BACKGROUND

The subject matter of the present disclosure broadly relates to the art of spring devices and, more particularly, to gas spring end members configured for use in forming gas spring assemblies as well as suspension systems including such gas spring assemblies and methods of assembly. In some cases, such gas spring end members, gas spring assemblies and suspension systems can be dimensioned or otherwise constructed for use in rail applications.

The subject matter of the present disclosure is capable of broad application and use in connection with a variety of applications and/or environments. In some cases, the subject matter may find particular application and use in conjunction with rail vehicles, and will be described herein with particular reference thereto. However, it is to be recognized and appreciated that the subject matter of the present disclosure is amenable to use in connection with other applications and environments, such as gas spring assemblies dimensioned for use in motorized vehicle applications, for example, without departing from the subject matter of the present disclosure, and that application and use described herein should not be interpreted as limiting.

A suspension system, such as may be used in connection with motorized rail vehicles and/or rolling-stock rail vehicles, for example, can include one or more spring elements for accommodating forces and loads associated with the operation and use of the corresponding device (e.g., a rail vehicle) to which the suspension system is operatively connected. In such applications, it is often considered desirable to utilize spring elements that operate at a lower spring rate, as a reduced spring rate can favorably influence certain performance characteristics, such as vehicle ride quality and comfort, for example. That is, it is well understood in the art that the use of a spring element having a higher spring rate (i.e. a stiffer spring) will transmit a greater magnitude of inputs to the sprung mass and that, in some applications, this could undesirably affect the sprung mass, such as, for example, by resulting in a rougher, less-comfortable ride of a vehicle. Whereas, the use of spring elements having lower spring rates (i.e., a softer or more-compliant spring) will transmit a lesser amount of the inputs to the sprung mass. However, lower spring rates generally correspond to increased displacement under load, which can be disadvantageous in certain applications and/or uses.

Additionally, end members of conventional rail spring assemblies are often constructed to withstand forces and loads acting on the rail spring assembly that are transmitted to, from and/or between the opposing structural members of an associated rail vehicle. As such, conventional rail spring end members are often constructed of metal materials and are designed to withstand conditions (e.g., exposure to outdoor weather conditions) associated with use in operation during over-the-rail travel and/or under similar environments, such as impacts from foreign objects and/or the collection of dirt and debris. In some cases, however, it may be desirable to reduce the overall weight of a suspension system, and reducing the weight of the end members of the one or more rail spring assemblies could be one contributing factor to achieving such a goal.

Notwithstanding the widespread usage and overall success of the wide variety of end member designs that are known in the art, it is believed that a need exists to meet these competing goals while still retaining comparable or improved performance, ease of manufacture, ease of assembly, ease of installation and/or reduced cost of manufacture, without adversely affecting the strength, rigidity, robustness and/or overall integrity of the end members and gas spring assemblies.

BRIEF SUMMARY

One example of a gas spring end member that is dimensioned for securement to an associated end of an associated flexible spring member can include an end member body formed substantially entirely from a polymeric material. The end member body can have a longitudinal axis and can include a body wall that includes an end wall portion oriented transverse to the longitudinal axis. The end wall portion can at least partially define a mounting plane of the gas spring end member that is dimensioned to abuttingly engage an associated structural component. The body wall can also include an outer peripheral wall portion that is disposed radially outward of the end wall portion and that at least partially defines an outer peripheral edge of the gas spring end member. The outer peripheral wall portion can be axially offset from the end wall portion in a direction away from the mounting plane.

One example of a gas spring assembly in accordance with the subject matter of the present disclosure can include a flexible spring member that has a longitudinal axis and that extends longitudinally between first and second open ends. The flexible spring member can include a flexible wall extending peripherally about the longitudinal axis to at least partially define a spring chamber between the first and second open ends. A first end member can be secured across the first open end such that a substantially fluid-tight seal is formed therebetween. The first end member can include an end member body formed substantially entirely from a polymeric material. The end member body can include a body wall with an end wall portion oriented transverse to the longitudinal axis. The body wall can also include an outer peripheral wall portion that is disposed radially outward of the end wall portion and that at least partially defines an outer peripheral edge of the first end member. The body wall can further include an outer side wall portion extending from along the end wall portion to an inner edge disposed in fluid communication with the spring chamber. The end wall portion can at least partially define a mounting plane of the first end member that is dimensioned to abuttingly engage an associated structural component. The outer peripheral wall portion can be axially offset from the end wall portion in a direction away from the mounting plane and toward the inner edge.

One example of a suspension system in accordance with the subject matter of the present disclosure can include a pressurized gas system and at least one gas spring assembly in accordance with the foregoing paragraph. The spring chamber of the at least one gas spring assembly can be disposed in fluid communication with the pressurized gas system such that pressurized gas can be transferred into and out of the spring chamber.

One example of a method of assembling a gas spring assembly in accordance with the subject matter of the present disclosure can include providing a flexible spring member that has a longitudinal axis and that extends longitudinally between first and second open ends. The flexible spring member can include a flexible wall that can extend peripherally about the longitudinal axis to at least partially define a spring chamber between the first and second open ends. The method can also include providing a first end member that can include an end member body formed substantially entirely from a polymeric material. The end member body can include a body wall with an end wall portion that is oriented transverse to the longitudinal axis. The body wall can also include an outer peripheral wall portion that is disposed radially outward of the end wall portion and that at least partially defines an outer peripheral edge of the first end member. The end wall portion can at least partially define a mounting plane of the first end member that can be dimensioned to abuttingly engage an associated structural component. The outer peripheral wall portion can be axially offset from the end wall portion in a direction away from the mounting plane. The method can further include positioning the first end of the flexible spring member in abutting engagement along the outer peripheral wall portion of the first end member. The method can also include securing the first end of the flexible spring member along the outer peripheral wall portion of the first end member such that a substantially fluid-tight seal is formed therebetween.

DETAILED DESCRIPTION

Turning now to the drawings, it is to be understood that the showings are for purposes of illustrating examples of the subject matter of the present disclosure and are not intended to be limiting. Additionally, it will be appreciated that the drawings are not to scale and that portions of certain features and/or elements may be exaggerated for purposes of clarity and/or ease of understanding.

Figure 1:
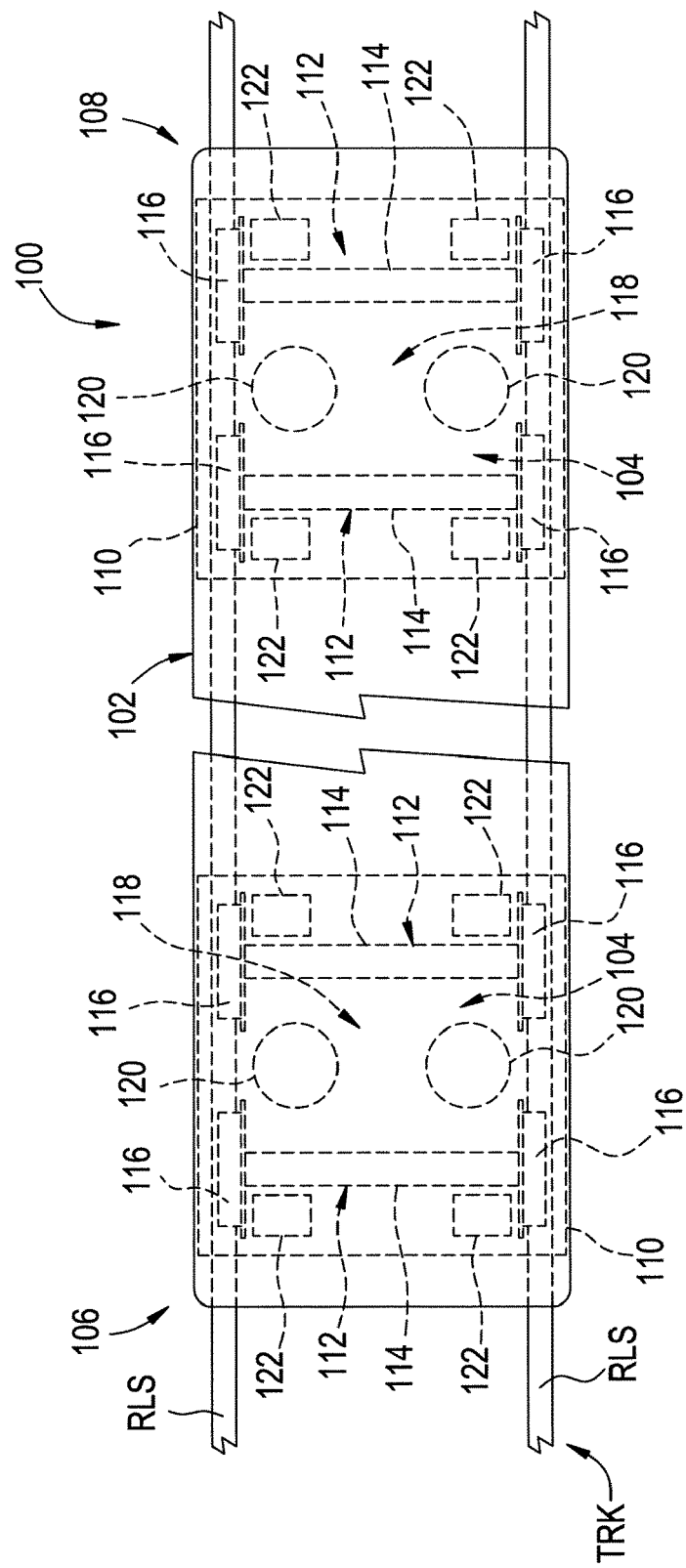
FIG. 1 is a schematic representation of one example of a vehicle including a suspension system in accordance with the subject matter of the present disclosure.

FIG. 1 illustrates one example of a vehicle including a suspension system in accordance with the subject matter of the present disclosure, such as a rail vehicle 100 that is adapted for movement or is otherwise displaceable along a track TRK that is at least partially formed by rails RLS of an indefinite length. It will be appreciated that the subject matter of the present disclosure is broadly applicable for use in a wide variety of applications, and that use in connection with rail vehicle 100 merely represents one example of a suitable application. Rail vehicle 100 is shown being representative of rolling stock (e.g., a railcar) rather than an engine or traction drive vehicle. However, this representative use is merely exemplary and not intended to be limiting.

Rail vehicle 100 includes a vehicle body 102 supported on one or more frame and wheel assemblies 104, two of which are shown in FIG. 1. In some cases, frame and wheel assemblies 104 may be referred to in the art as "trucks," "rail bogies" or simply "bogies," and such terms may be used herein in an interchangeable manner. Bogies 104 are shown as being disposed toward opposing ends 106 and 108 of rail vehicle 100.

Bogies 104 are shown in FIG. 1 as including a frame 110 as well as one or more wheel sets 112 that are typically formed by an axle 114 and a pair of spaced-apart wheels 116. Normally, bogies 104 include at least two wheel sets, such as is shown in FIG. 1, for example, that are operatively connected to the frame in a manner suitable for permitting the wheels to roll along rails RLS of track TRK having an indefinite length. In many cases, a primary suspension arrangement (not shown) is operatively connected between the wheels sets and the frame to permit relative movement therebetween. Bogies 104 are also shown as including a secondary suspension system 118 that includes at least one gas spring assembly of a type commonly referred to in the art as a "rail spring assembly" or simply a "rail spring". In the exemplary arrangement shown in FIGS. 1 and 2, bogies 104 include two rail or gas spring assemblies 120 that are operatively connected between frame 110 and vehicle body 102 to permit relative movement therebetween.

Rail vehicles, such as rail vehicle 100, for example, typically include a braking system with one or more brakes operatively associated with each wheel set. In the exemplary arrangement in FIG. 1, two brakes 122 are shown as being operatively associated with each of wheel sets 112 with one brake disposed adjacent each of wheels 116. It will be appreciated, however, that other arrangements could alternately be used.

Additionally, rail vehicles, such as rail vehicle 100, for example, typically include at least one pneumatic or pressurized gas system that is operatively associated therewith. In many cases, components of the one or more pneumatic systems can be distributed along the length of a train that is formed from a plurality of rail vehicles, such as one or more traction-drive engines and one or more rolling stock vehicles, for example. In such cases, each individual rail vehicle will include one or more portions of the pneumatic system. Usually, these one or more portions are serially connected together to form an overall pneumatic system of a train.

Typical pneumatic systems include two or more separately controllable portions, such as a pneumatic braking system that is operatively associated with the vehicle brakes (e.g., brakes 122) and a pneumatic supply system that is operatively associated with the other pneumatically-actuated devices of the rail vehicle, such as the secondary suspension system, for example. As such, rail vehicles typically include a dedicated conduit for each of these two systems. Such conduits normally extend lengthwise along the vehicle body and are often individually referred to as a brake pipe and a supply pipe.

Figure 2:
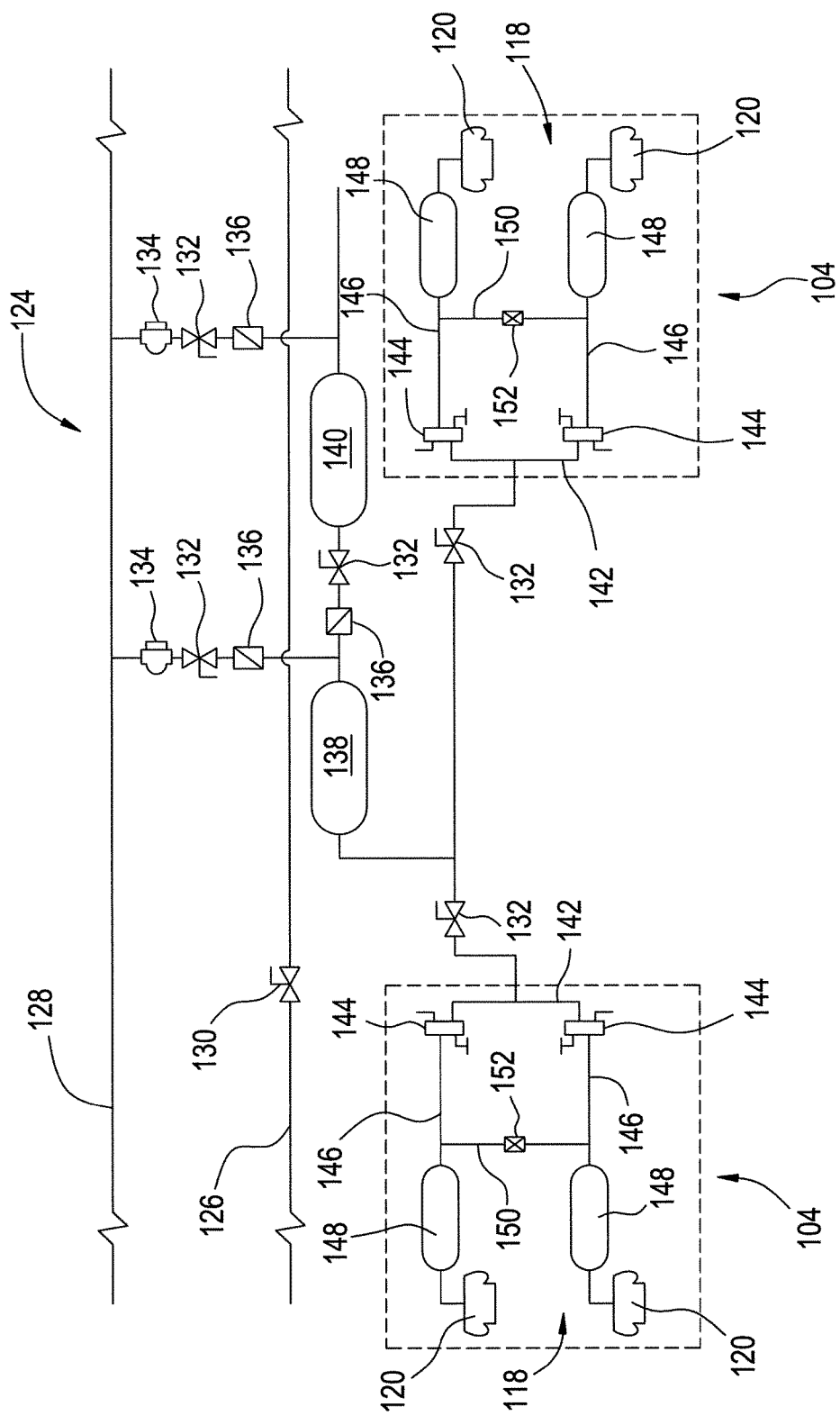
FIG. 2 is a schematic representation of one example of a pressurized gas system operatively associated with the suspension system in FIG. 1.
Figure 3:
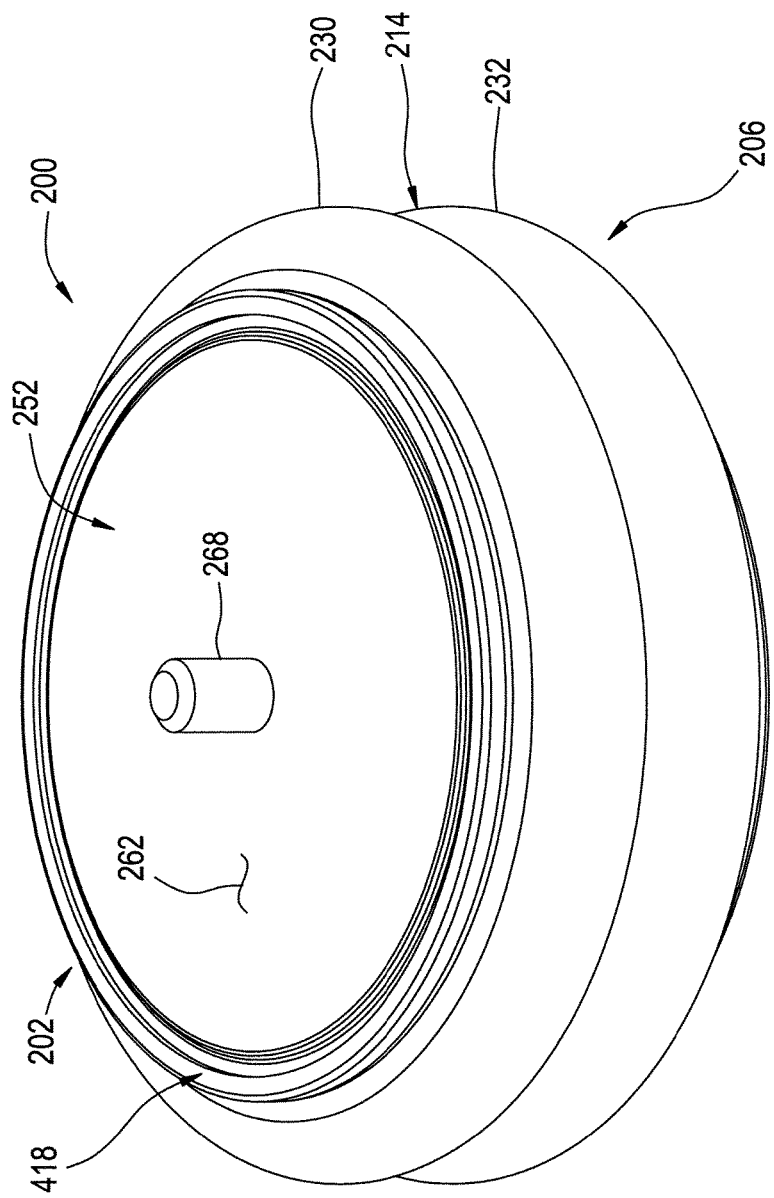
FIG. 3 is a top perspective view of one example of a gas spring assembly in accordance with the subject matter of the present disclosure.
Figure 4:
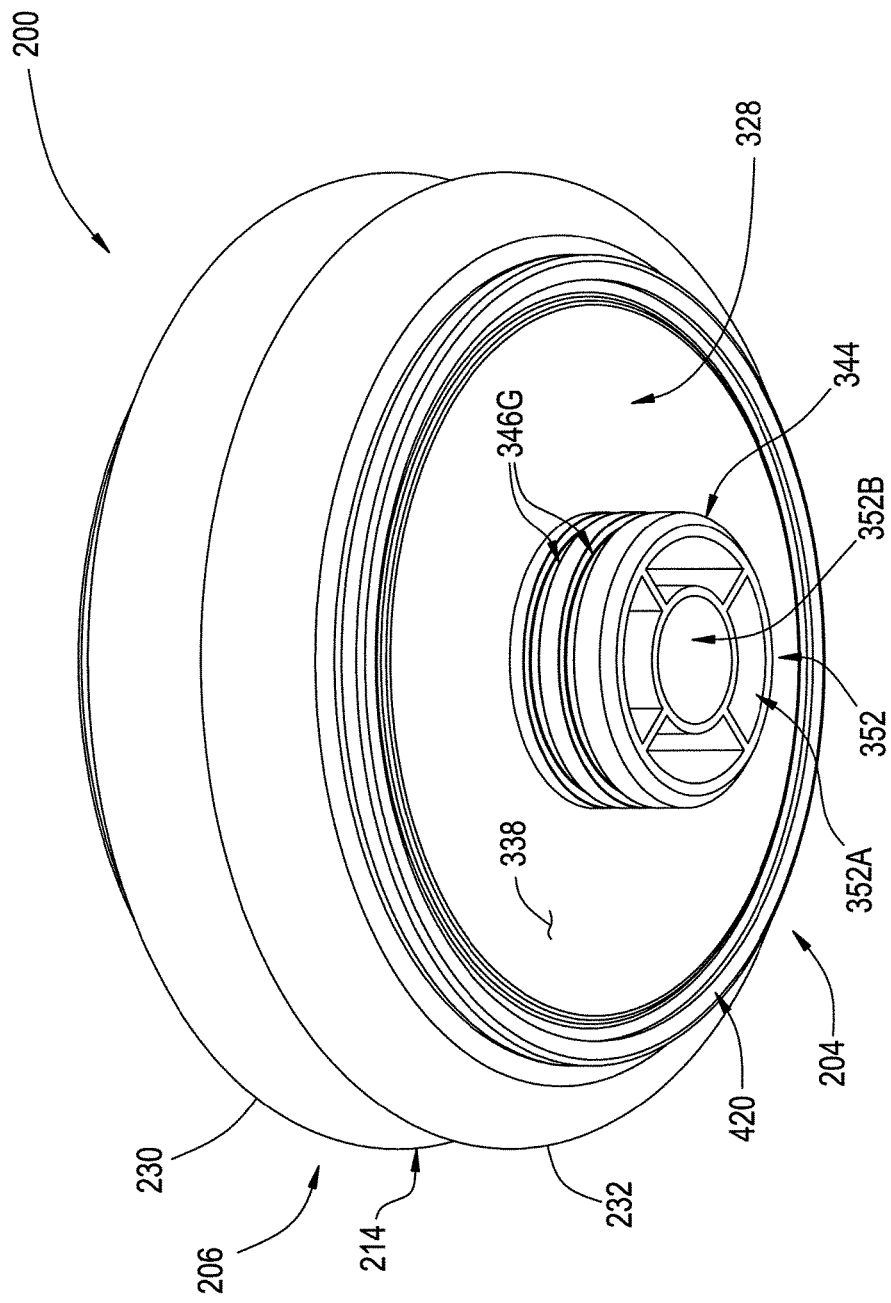
FIG. 4 is a bottom perspective view of the exemplary gas spring assembly in FIG. 3.

FIG. 2 illustrates one example of a pneumatic or pressurized gas system 124 that is operatively associated with rail vehicle 100 and includes a pneumatic or pressurized gas braking system (not numbered) with a brake pipe 126 in fluid communication with at least brakes 122 (FIG. 1) and a pneumatic or pressurized supply system (not numbered) with a supply pipe 128 in fluid communication with at least gas spring assemblies 120 of secondary suspension system 118. It will be recognized and appreciated that pneumatic system 124 will include a wide variety of other components and devices. For example, the braking system can include one or more isolation valves 130 that can be fluidically connected along brake pipe 126. As other examples, the pneumatic supply system can include one or more isolation valves 132, one or more filters 134 and/or one or more non-return valves 136 (which may be alternately referred to as "one-way" or "check" valves). The pneumatic supply system can also include one or more reservoirs or other pressurized gas storage devices. In the arrangement shown in FIG. 2, for example, the pneumatic supply system includes a reservoir 138 that is operative to store a quantity of pressurized gas for use in supplying gas spring assemblies 120 of the secondary suspension system, and a reservoir 140 that is operative to store a quantity of pressurized gas for use as an auxiliary reservoir of the braking system.

Generally, certain components of the braking system, such as brakes 122, for example, as well as certain components of the pneumatic supply system are supported on or otherwise operatively associated with one of bogies 104 of rail vehicle 100. For example, supply lines 142 can fluidically interconnect bogies 104 with the pneumatic supply system. Supply lines 142 are shown as being fluidically connected with one or more leveling valves 144 that are operatively connected with gas spring assemblies 120, such as by way of gas lines 146, and are selectively operable to transfer pressurized gas into and out of the gas spring assemblies. In some cases, a pressurized gas storage device or reservoir 148 can, optionally, be fluidically connected along gas lines 146 between leveling valve 144 and gas spring assembly 120. Additionally, a cross-flow line 150 can, optionally, be connected in fluid communication between two or more of gas lines 146. In some cases, a control valve 152, such as a duplex check valve, for example, can be fluidically connected along cross-flow line 150, such as is shown in FIG. 2, for example.

One example of a gas spring assembly in accordance with the subject matter of the present disclosure, such as may be suitable for use as one or more of gas spring assemblies 120 in FIGS. 1 and 2, for example, is shown as gas spring assembly 200 in FIGS. 3-11. The gas spring assembly has a longitudinal axis AX and includes an end member assembly 202, an end member assembly 204 spaced longitudinally from end member assembly 202. A flexible spring member 206 extends peripherally about the longitudinal axis and is secured between end member assemblies 202 and 204 in a substantially fluid-tight manner to at least partially define a spring chamber 208 therebetween.

Figure 5:
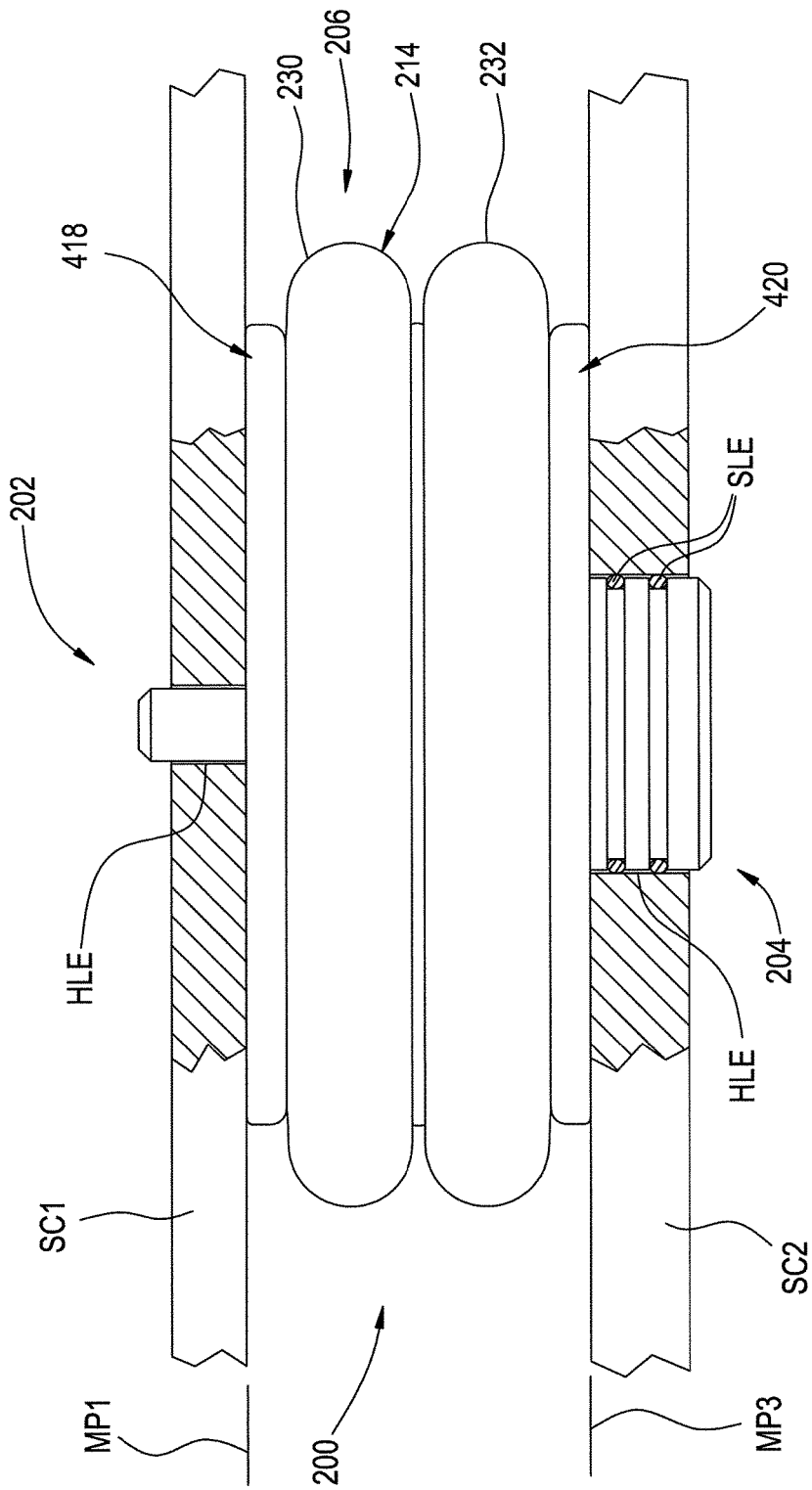
FIG. 5 is a side elevation view of the exemplary gas spring assembly in FIGS. 3 and 4.
Figure 6:
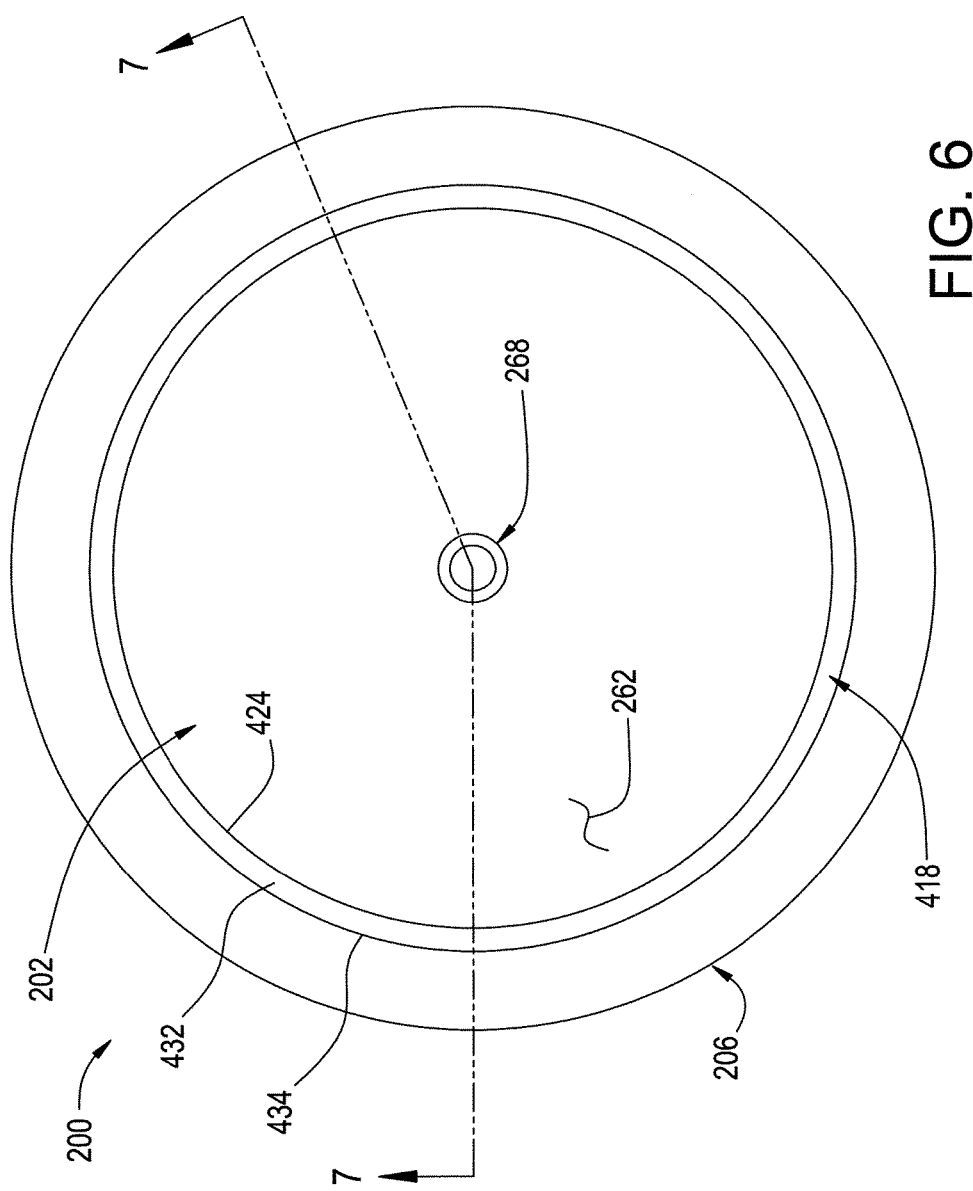
FIG. 6 is a top plan view of the exemplary gas spring assembly in FIGS. 3-5.

Gas spring assembly 200 can be disposed between associated sprung and unsprung masses of an associated vehicle in any suitable manner. For example, one end member assembly can be operatively engaged with an associated sprung mass with the other end member assembly disposed toward and operatively engaged with an associated unsprung mass. As shown in FIG. 5, for example, end member assembly 202 can be disposed toward or otherwise on or along a structural component SC1, such as an associated vehicle body 102 in FIG. 1, for example, and can be operatively engaged therewith in any suitable manner, such as by operatively engaging an opening or hole HLE, for example. As another example, end member assembly 204 can be disposed toward or otherwise on or along a structural component SC2, such as an associated rail bogie 104 in FIG. 1, for example, and can be operatively engaged therewith in any suitable manner, such as by operatively engaging an opening or hole HLE, for example. In some cases, one or more of structural components SC1 and/or SC2 can at least partially form a pressurized gas reservoir or other device that is disposed in fluid communication with pneumatic system 124. In such cases, one or more sealing elements can, optionally, be disposed in sealing engagement between one of the end member assemblies (e.g., end member assemblies 202 and/or 204) and a corresponding one of the associated structural components (e.g., structural components SC1 and/or SC2). As one example, gas spring assembly 200 can, optionally, include sealing elements SLE disposed between end member assembly 204 and structural component SC2 such that a substantially fluid-tight seal is formed therebetween.

Gas spring assembly 200 is shown as being of a type commonly referred to as a convoluted or bellows-type construction. It will be recognized and appreciated, however, that the subject matter of the present disclosure is amenable to use in connection with gas spring assemblies of other types, kinds and/or constructions, such as elongated sleeve-type constructions that include one or more rolling lobes. Thus, it will be appreciated that gas spring assemblies including a flexible spring member of any suitable type, kind and/or construction can be used, and that the exemplary description of a convoluted-type flexible spring member is not intended to be limiting.

As one example, in the arrangement shown in FIGS. 3-11, flexible spring member 206 extends longitudinally between ends 210 and 212. Flexible spring member 206 includes a flexible wall 214 that extends peripherally about longitudinal axis AX and longitudinally between ends 210 and 212 to at least partially define spring chamber 208. It will be appreciated that flexible spring member 206 and flexible wall 214 thereof can be formed in any suitable manner and from any suitable material or combination of materials, such as by using one or more filament-reinforced, elastomeric plies or layers and/or one or more un-reinforced, elastomeric plies or layers, for example. Typically, one or more filament-reinforced, elastomeric plies and one or more un-reinforced, elastomeric plies will be used together and formed from a common elastomeric material, such as a synthetic rubber, a natural rubber or a thermoplastic elastomer. In other cases, however, a combination of two or more different materials, two or more compounds of similar materials, or two or more grades of the same material could be used.

Flexible wall 214 is shown as including an outer surface 216 as well as an inner surface 218 that can at least partially define spring chamber 208. As identified in FIGS. 8-11, flexible wall 214 can include an outer or cover ply 220 that at least partially forms outer surface 216 and an inner or liner ply 222 that at least partially forms inner surface 218. In a preferred arrangement, flexible wall 214 can also include one or more reinforcing plies disposed between outer and inner surfaces 216 and 218. For example, reinforcing plies 224 and 226 are shown embedded within the elastomeric material of flexible wall 214.

The one or more reinforcing plies can be of any suitable construction, configuration and/or arrangement. For example, the one or more reinforcing plies can include one or more lengths of filament material that are at least partially embedded therein. It will be appreciated that the one or more lengths of filament material can be of any suitable type, kind and/or construction, such as monofilament polymeric strands, braided cotton yarn or bundled carbon fibers, for example. Furthermore, such one or more lengths of filament material could optionally be coated or otherwise treated, such as, for example, to improve adhesion with the adjacent plies or other surrounding material. For example, the filament material could be rubber coated, such that upon applying a layer of rubber over the filament material improved adhesion between various layers of material could result during and/or after vulcanization or another curing process, for example. Additionally, it will be appreciated that the one or more lengths of filament material, if provided, can be oriented in any suitable manner. As one example, the plurality of reinforcing filaments of reinforcing ply 224 can, in some cases, be disposed at one bias angle and the plurality of reinforcing filaments of reinforcing ply 226 can, in such cases, be disposed at another bias angle. It will be appreciated that any suitable bias angles can be used, such as bias angles within a range of from approximately 3 degrees to approximately 87 degrees, for example. In some cases, the filament segments can be disposed at approximately the same bias angle relative to a common feature (e.g., longitudinal axis AX) but oriented in opposing directions relative to one another.

As discussed above, it will be appreciated that flexible wall 214 can be of any suitable type, kind, construction and/or configuration. In the exemplary arrangement in FIGS. 3-11, flexible wall 214 is shown as being of a convoluted bellows-type configuration that can, optionally, include one or more convoluted wall portions. Additionally, flexible spring member 206 can, optionally, include one or more girdle hoops 228 that can be at least partially embedded within flexible wall 214. In such cases, flexible wall 214 can include a convoluted wall portion 230 that can extend between girdle hoop 228 and end member assembly 202, and a convoluted wall portion 232 that can extend between girdle hoop 228 and end member assembly 204.

In a preferred arrangement, the flexible spring member will include a mounting bead formed along at least one end thereof that is dimensioned for securement to an end member or an end member assembly to at least partially form the gas spring assembly. In the arrangement shown in FIGS. 3-11, flexible spring member 206 includes a mounting bead 234 disposed along end 210 and a mounting bead 236 disposed along end 212. It will be appreciated, however, that one of mounting beads 234 and 236 can be considered optional.

Additionally, it will be appreciated that mounting beads 234 and/or 236 can be of any suitable size, shape, configuration and/or construction. For example, mounting beads 234 and 236 are shown as including an end surface portion 238 that is oriented generally transverse to longitudinal axis AX. Mounting beads 234 and 236 are also shown as including an outer peripheral surface portion 240 that extends peripherally about longitudinal axis AX and can at least partially define an outermost periphery of the mounting beads. Mounting beads 234 and 236 can further include an outer bead surface portion 242 that faces generally opposite end surface portion 238 and can, in some cases, at least partially define a groove or slot 244 that extends annularly around axis AX between flexible wall 214 and mounting beads 234 and 236. In some cases, the groove or slot can extend into the flexible wall adjacent either or both of the mounting beads. In other cases, the groove or slot can be at least partially formed by or in a transitional region 246 that extends between flexible wall 214 and either or both of mounting beads 234 and 236.

In a preferred arrangement, end surface portions 238 are dimensioned to abuttingly engage a wall or surface of one of end member assemblies 202 and/or 204 such that a substantially fluid-tight seal can be formed therebetween. In some cases, one or more of the mounting beads can, optionally, include a bead reinforcing element 248, such as an endless, annular bead wire or core, for example, that is at least partially embedded therein and is substantially inextensible in comparison with at least one or more materials of flexible wall 214. Additionally, in some cases, end sections 250 of one or more of reinforcing plies 224 and/or 226 can extend from along flexible wall 214 through transition region 246 and operatively engage bead reinforcing elements 248 in a suitable manner. As one example, the bead reinforcing elements can take the shape of endless, annular rings that form a central opening (not numbered) therethrough, and end sections 250 of one or more of reinforcing plies 224 and/or 226 can extend through the opening and wrap at least partially around bead reinforcing element 248, such as is shown in FIGS. 8-11, for example.

Figure 7:
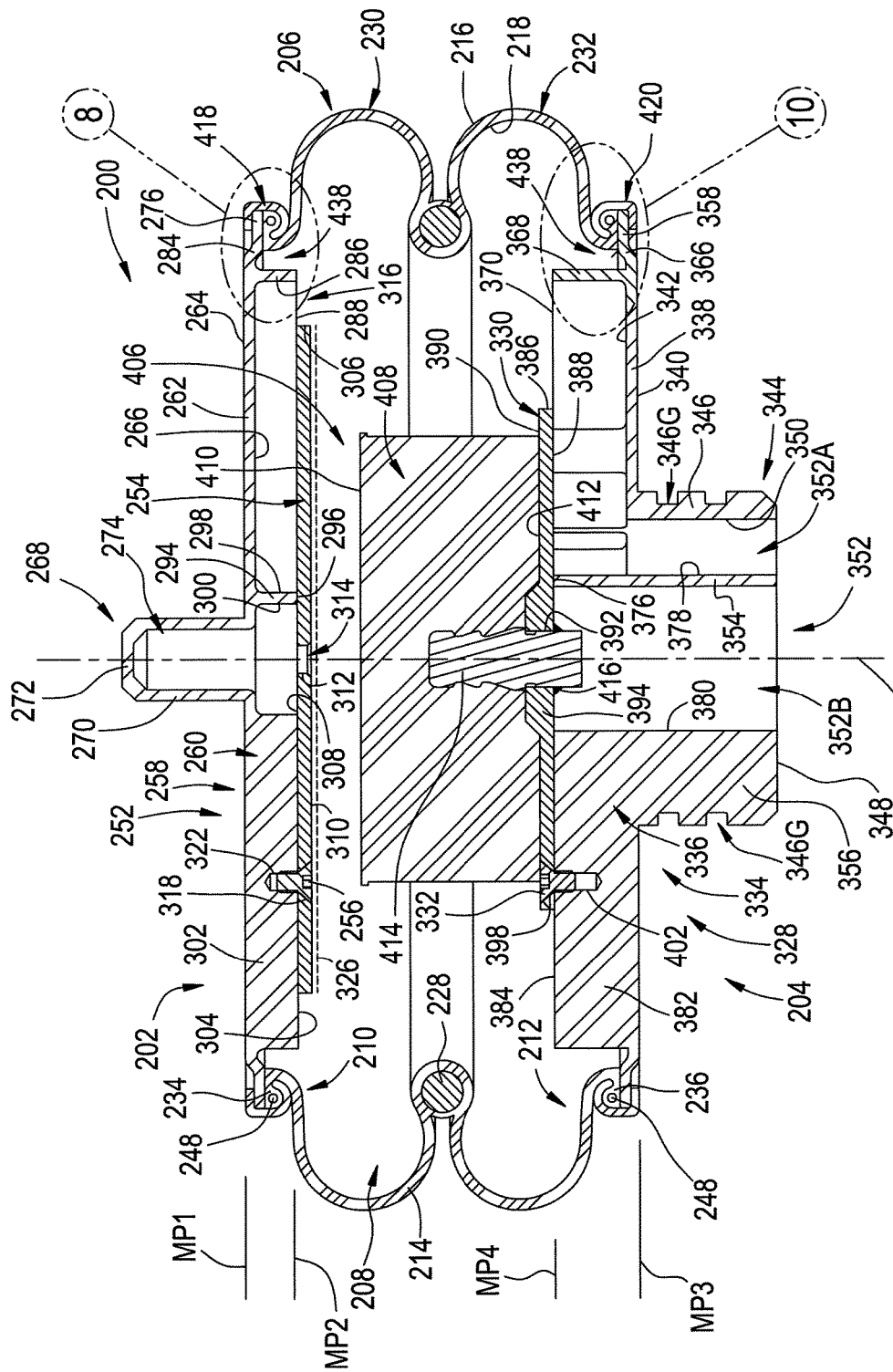
FIG. 7 is a cross-sectional side view of the exemplary gas spring assembly in FIGS. 3-6 taken from along line 7-7 in FIG. 6.
Figure 8:
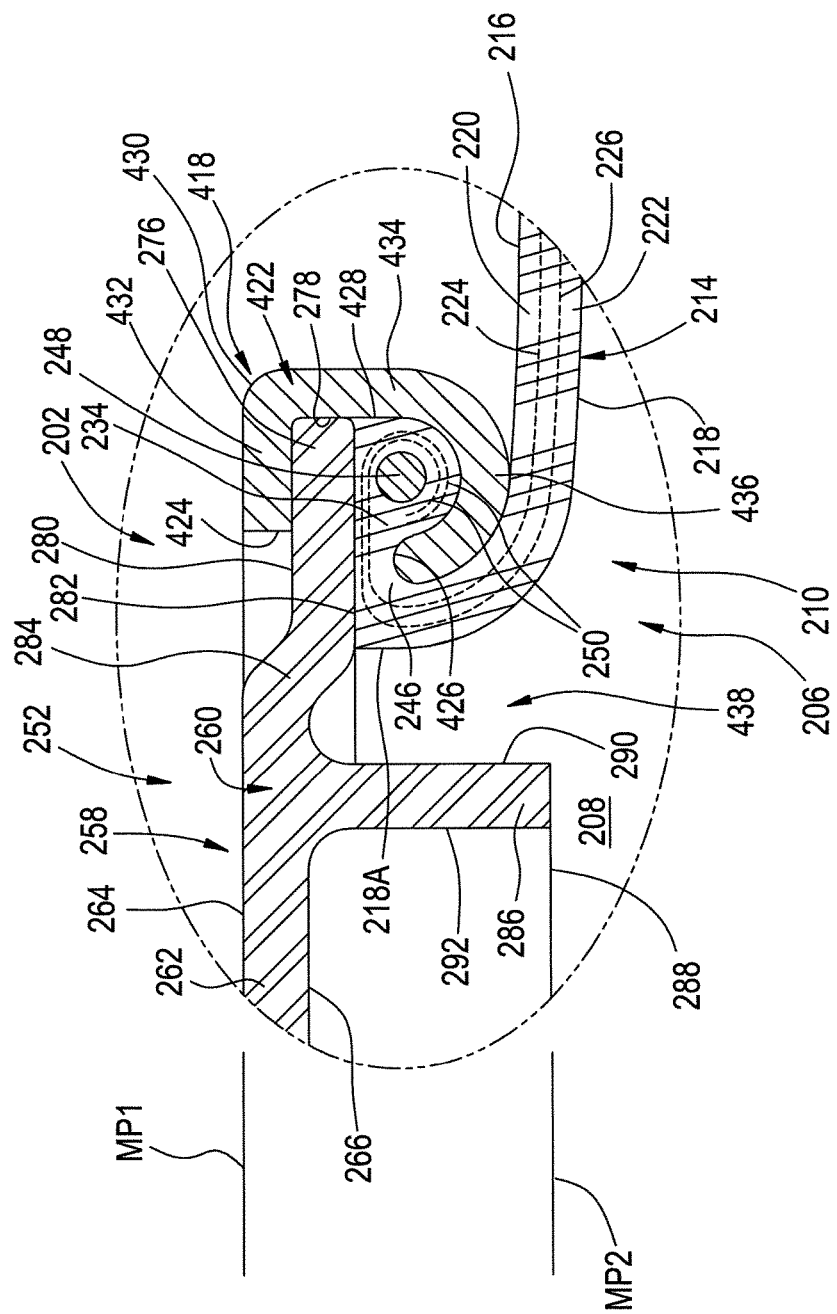
FIG. 8 is an enlarged view of the portion of the exemplary gas spring assembly in FIGS. 3-7 identified as Detail 8 in FIG. 7.
Figure 12:
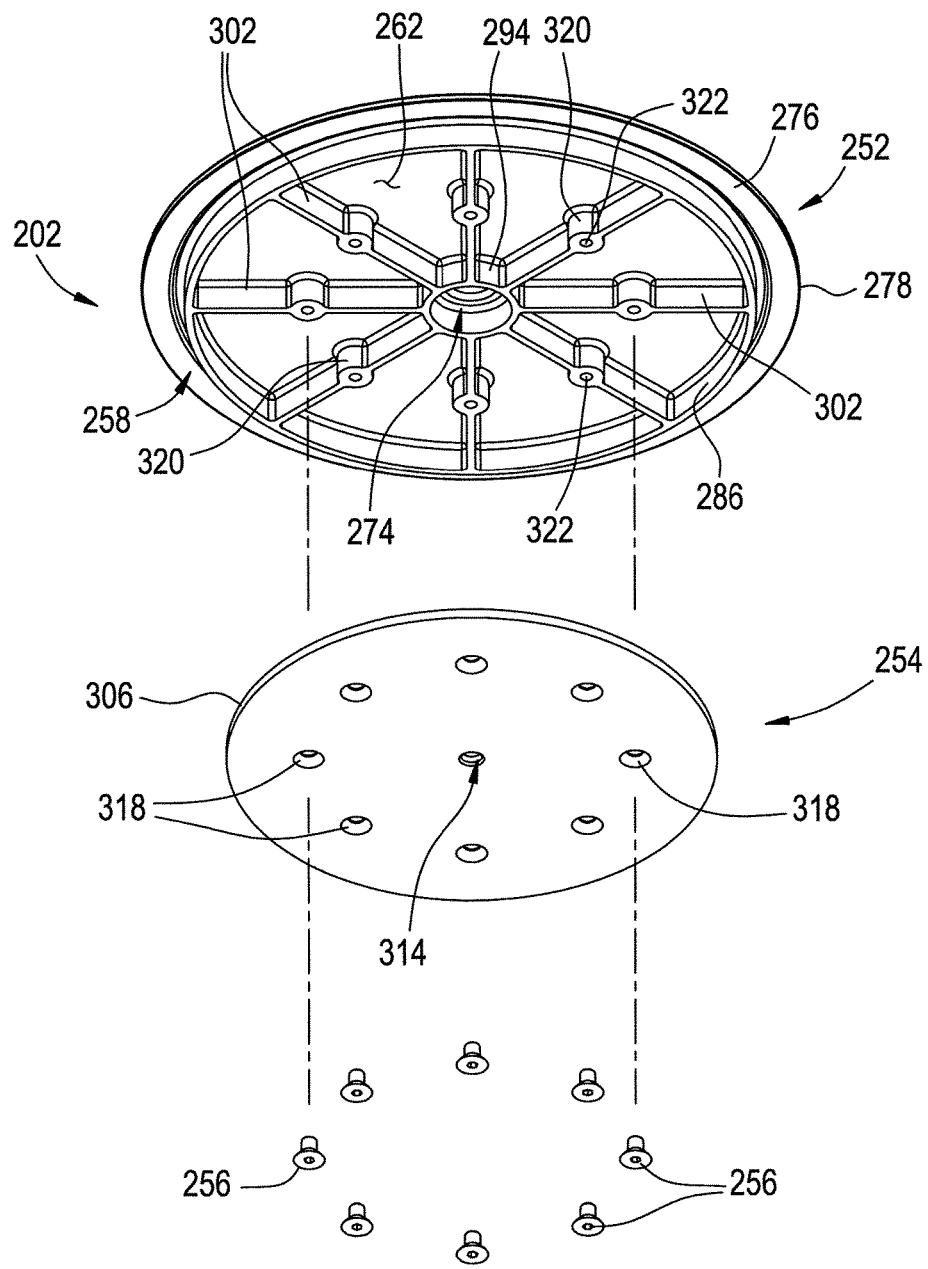
FIG. 12 is an exploded view of one example of an end member assembly in accordance with the subject matter of the present disclosure suitable for use in the exemplary gas spring assembly shown in FIGS. 3-8 and 10.
Figure 13:
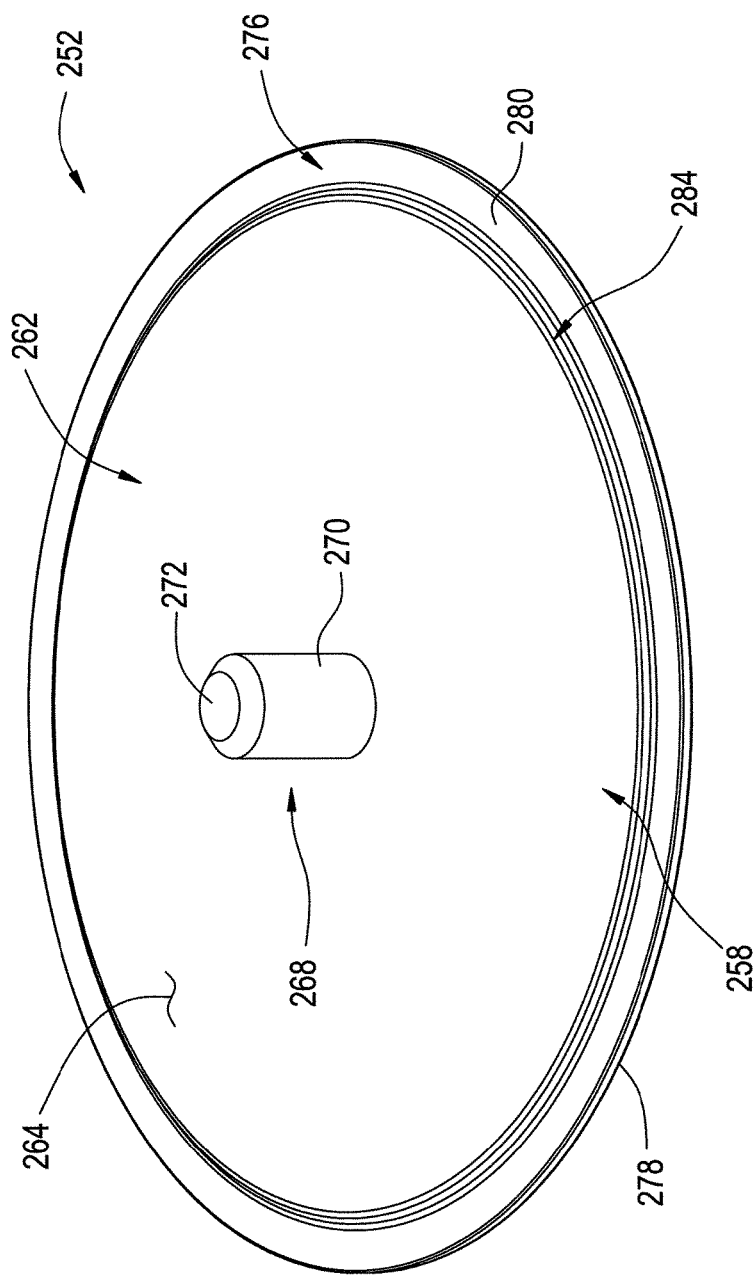
FIG. 13 is a top perspective view of one example of an end member in accordance with the subject matter of the present disclosure, such as is shown in use in FIGS. 3, 5-9 and 12.
Figure 14:
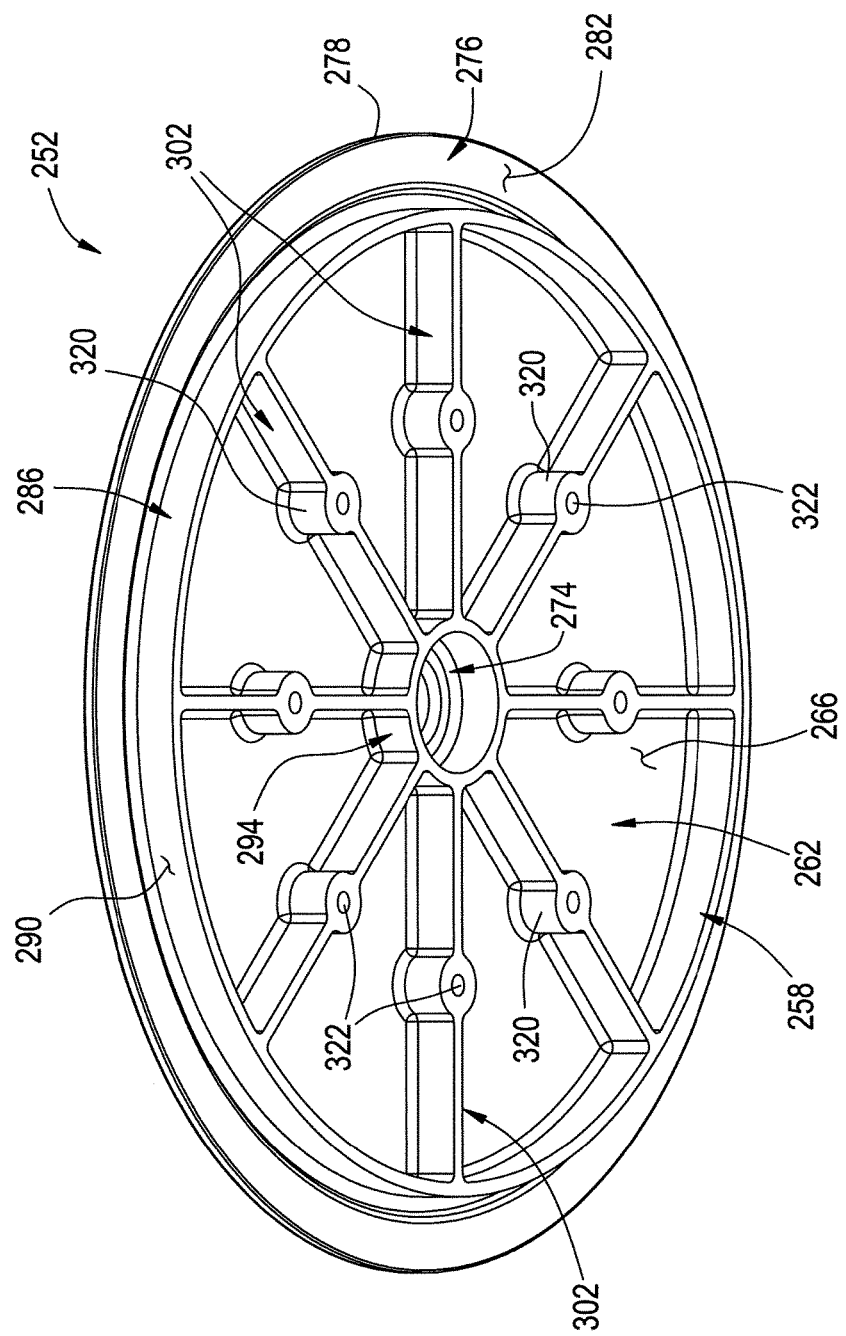
FIG. 14 is a bottom perspective view of the exemplary end member in FIG. 13.
Figure 15:
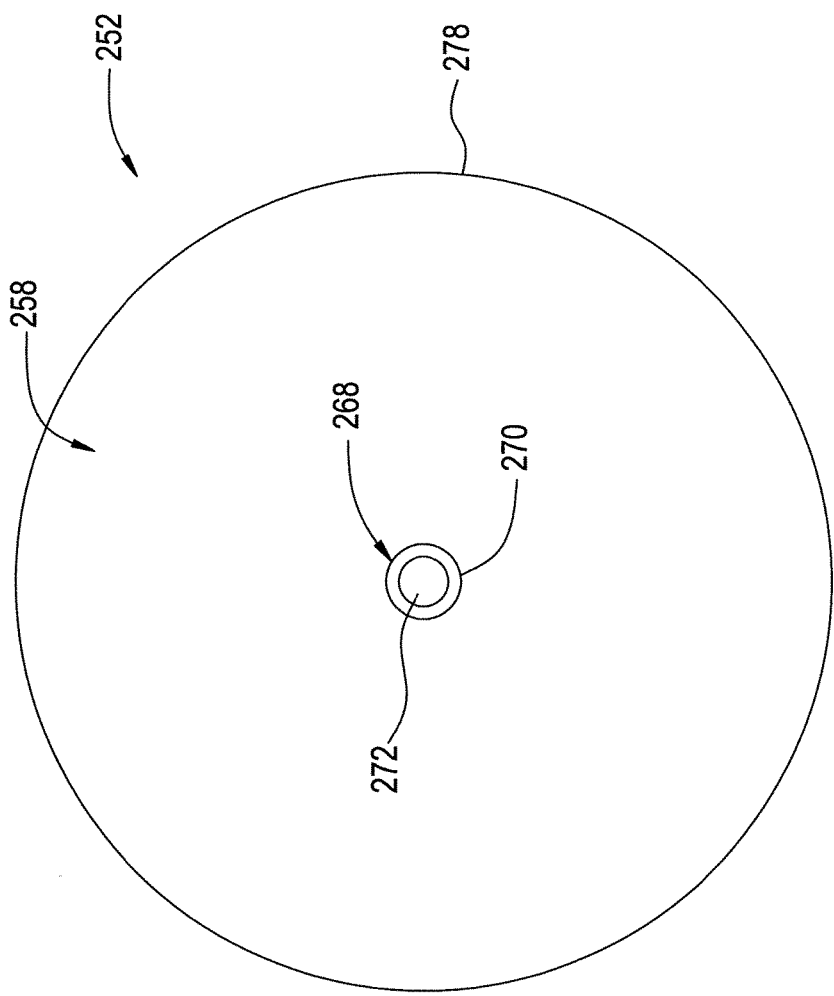
FIG. 15 is a top plan view of the exemplary end member in FIGS. 13 and 14.
Figure 16:
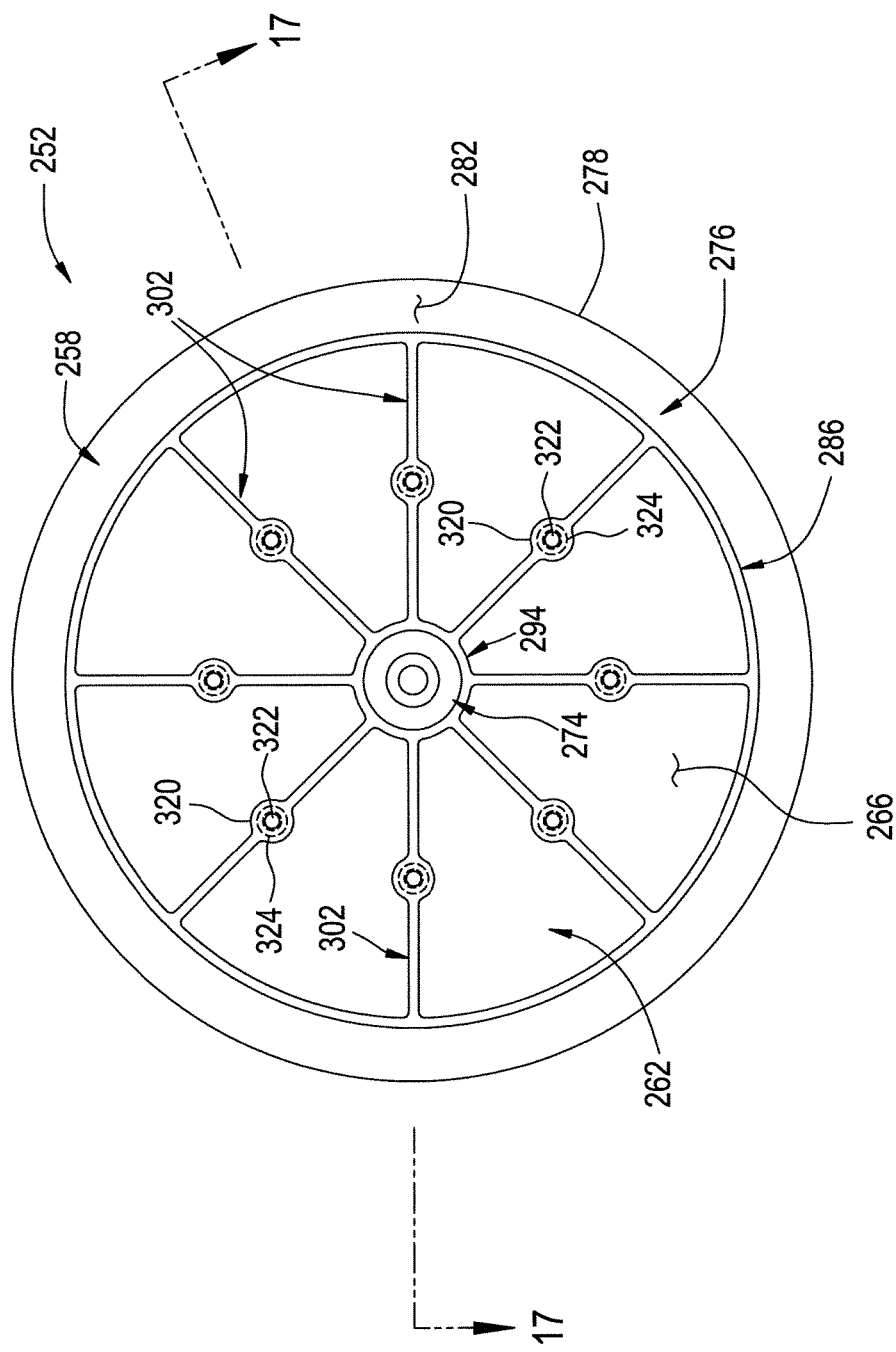
FIG. 16 is a bottom plan view of the exemplary end member in FIGS. 13-15.
Figure 17:
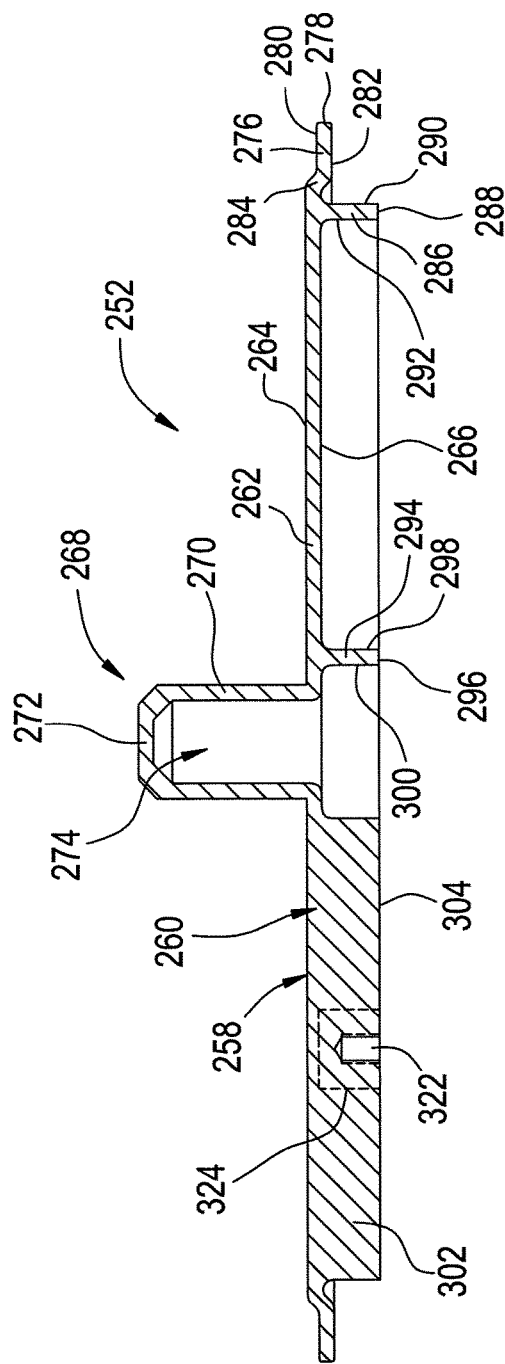
FIG. 17 is a cross-sectional side view of the exemplary end member in FIGS. 13-16 taken from along line 17-17 in FIG. 16.

In the exemplary arrangement in FIGS. 3, 5-9 and 12-17, end member assembly 202 is shown as including an end member 252 and an inner plate 254 that is supported within spring chamber 208 on or along end member 252 in facing relation to end member 204. Inner plate 254 can be secured on or along end member 252 in any suitable manner, such as by way of one or more securement devices (e.g., threaded fasteners). As shown in FIGS. 7 and 12, for example, a plurality of securement devices 256 can extend between and operatively interconnect the inner plate and the end member. It will be appreciated, however, that other configurations and/or arrangements could alternately be used.

End member 252 can include an end member body 258 that can include any combination of one or more walls and/or one or more wall portions. In a preferred arrangement, an end member body of an end member assembly in accordance with the subject matter of the present disclosure (e.g., end member body 258 of end member assembly 202) can be at least partially formed from one or more polymeric materials, such as by way of one or more processes that permit the features and elements described herein to be integrally formed with other features of the end member assembly. It will be appreciated that the end member and end member body can be formed from any suitable material or combination of materials. For example, end member body 258 can be at least partially formed from a substantially rigid polymeric material, such as a fiber-reinforced polypropylene, a fiber-reinforced polyamide, or an unreinforced (i.e., relatively high-strength) thermoplastic (e.g., polyester, polyethylene, polyamide, polyether or any combination thereof), for example.

End member body 258 includes a body wall 260 that can include an end wall portion 262 oriented transverse to longitudinal axis AX. End wall portion 262 can include a surface portion 264 that can at least partially define a mounting plane MP1 of end member assembly 202. End wall portion 262 can also include a surface portion 266 facing away from surface portion 264 and toward spring chamber 208. In a preferred arrangement, surface portion 264 can be disposed in fluid communication with the spring chamber. End member body 258 can, optionally, include a mounting post 268 projecting axially outward beyond surface portion 264 from along end wall portion 262. Body wall 260 can include a post side wall portion 270 that extends axially outward from along end wall portion 262 toward a post end wall portion 272 that at least partially forms a closed end of mounting post 268. In some cases, the mounting post can include a post cavity 274 formed therein. Additionally, in some cases, post cavity 274 can, optionally, be disposed in fluid communication with spring chamber 208.

Body wall 260 can also include an outer peripheral wall portion 276 that is disposed radially outward of end wall portion 262. Outer peripheral wall portion 276 can extend radially outward to an outer peripheral edge 278 that can at least partially define an outermost periphery of end member 252. Outer peripheral wall portion 276 is shown as being axially offset from end wall portion 262 in a direction away from mounting plane MP1. Outer peripheral wall portion 276 includes a surface portion 280 disposed in facing relation to mounting plane MP1 and a surface portion 282 facing opposite surface portion 280 and generally away from the mounting plane. A connecting wall portion 284 extends between and operatively connects end wall portion 262 and outer peripheral wall portion 276. In a preferred arrangement, at least outer peripheral wall portion 276 and connecting wall portion 284 can extend annularly about longitudinal axis AX such that end wall portion 262 and end member 252 can have an approximately circular overall shape and configuration.

Body wall 260 can further include an outer side wall portion 286 that extends from along surface portion 266 of end wall portion 262 axially toward a distal edge 288. Outer side wall portion 286 can include a surface portion 290 facing radially outward and a surface portion 292 facing radially inward opposite surface portion 290. In a preferred arrangement, outer side wall portion 286 is spaced radially inward from outer peripheral wall portion 276 such that connecting wall portion 284 is disposed therebetween. Body wall 260 can also include an inner side wall portion 294 that is disposed radially inward of outer side wall portion 286. Inner side wall portion 294 can extend from along surface portion 266 of end wall portion 262 axially toward a distal edge 296. Inner side wall portion 294 can include a surface portion 298 facing radially outward toward surface portion 292 of outer side wall portion 286, and a surface portion 300 facing radially inward opposite surface portion 298. In some cases, surface portion 300 can be disposed in fluid communication with and/or at least partially define post cavity 274.

One or more of distal edges 288 and 296 can at least partially define a mounting plane MP2 of end member 252 along which inner plate 254 can, in some cases, be disposed or otherwise at least partially supported in a suitable manner. In a preferred arrangement, distal edges 288 and 296 can be disposed in approximate alignment with one another. Body wall 260 can, optionally, include one or more support wall portions that can extend between and operatively interconnect outer and inner side wall portions 286 and 294. In a preferred arrangement, a plurality of support wall portions 302 can be disposed in spaced relation to one another about longitudinal axis AX. If provided, support wall portions 302 can extend radially between and operatively interconnect outer and inner wall portions 286 and 294, as discussed above. Additionally, support wall portions 302 can extend from along surface portion 266 of end wall portion 262 axially toward distal edges 304. In a preferred construction, distal edges 304 can be disposed in at least approximate alignment with one or more of distal edges 288 and/or 296. As such, in some cases, distal edges 304 can at least partially define mounting plane MP2.

As is well known in the art, it is generally desirable to avoid or at least minimize contact between opposing end members or end member assemblies of gas spring assemblies, such as may otherwise occur due to variations in load conditions and/or upon deflation of the gas spring assemblies, for example. In such cases, jounce bumpers or other suitable features and/or components can be disposed within the gas spring assemblies to address such conditions of use. It will be appreciated that any suitable combination of features and/or components can be used, and that any such features and/or components can be supported within the spring chamber of the gas spring assemblies in any suitable manner. For example, the end members and/or end member assemblies can include one or more features and/or components secured thereto or otherwise supported thereon. And, it will be appreciated that such one or more features and/or components can be operatively connected to the end members and/or end member assemblies in any suitable manner.

As one example, end member assembly 202 is shown and described herein as including inner plate 254, which can be of any suitable size, shape, configuration and/or construction. In the arrangement shown in FIGS. 7 and 12, inner plate 254 is shown as including a plate wall (not numbered) that extends radially outward to an outer peripheral edge 306. Inner plate 254 can also include a surface portion 308, a surface portion 310 facing opposite surface portion 308 and an inner edge 312 that at least partially defines an opening or passage 314 extending through the plate wall of inner plate 254. In a preferred arrangement, opening 314 can be disposed in fluid communication with post cavity 274 of end member body 258 such that the post cavity is disposed in fluid communication with spring chamber 208 through opening 314. In a preferred arrangement, outer peripheral edge 306 is spaced radially inward of surface portion 292 of outer side wall portion 286 such that a space or gap 316 is formed therebetween. In such a construction, the volume or area disposed between end member 252 and inner plate 254 radially outward of surface portion 298 can be disposed in fluid communication with spring chamber 208. It will be appreciated, however, that other configurations and/or arrangements could alternately be used.

As indicated above, inner plate 254 can be secured on or along end member body 258 of end member 252 in any suitable manner. As one example, inner plate 254 can include one or more openings or holes 318 extending through the plate wall that are dimensioned to receive a corresponding securement device, such as one of securement devices 256 (e.g., threaded fasteners), for example. As shown in FIG. 12, a plurality of holes 318 can be included that are disposed in spaced relation to one another about longitudinal axis AX. In which case, securement devices 256 can extend through holes 318 into operative engagement with end member body 258.

It will be appreciated that securement devices 256 can operatively engage any suitable features and/or components of end member 252. As one example, the securement devices can threadably engage corresponding threaded holes formed within the support wall portions that extend between and operatively interconnect the outer and inner wall portions of the end member body. As another example, body wall 260 can include a plurality of mounting bosses or mounting boss wall portions 320 that can extend from along surface portion 266 of end wall portion 262 axially toward mounting plane MP2. In a preferred construction, mounting boss wall portions 320 can, optionally, be disposed along support wall portions 302 with mounting boss wall portions 320 at least partially defining distal edges 304 and disposed in approximate alignment with mounting plane MP2. In such case, inner plate 254 can be supported on end member 252 such that surface portion 308 is disposed in abutting engagement along distal edges 304 of support wall portions 302 and/or mounting boss wall portions 320 with surface 310 facing toward end member assembly 204. Additionally, a suitable securement feature 322, such as a threaded hole, for example, can be provided on or along support wall portions 302 and/or mounting boss wall portions 320, if provided. In some cases, such a threaded hole or other securement feature can be formed directly into the material of end member body 258. In other cases, a plurality of inserts 324 or other securement elements can be at least partially embedded within support wall portions 302 and/or mounting boss wall portions 320 that are dimensioned to operatively engage securement devices 256. It will be appreciated, however, that other configurations and/or arrangements could alternately be used.

It will be appreciated that inner plate 254 can be formed from any suitable material or combination of materials, such as one or more metal (e.g., steel, aluminum) and/or one or more polymeric materials (e.g., fiber reinforced polymeric materials, such as glass or other fiber-reinforced polypropylene and glass or other fiber-reinforced polyamide, and high-strength (e.g., unfilled) polymeric materials, such as polyester, polyethylene, polypropylene or other polyether-based materials). In some cases, inner plate 254 can at least partially form a reduced-friction interface that will promote lateral displacement of end member assembly 202 relative to end member assembly 204 and/or any features or components supported within spring chamber 208 that are disposed therebetween. In some cases, the inner plate can be formed from a material or combination of materials having reduced-friction properties and/or characteristics. In other cases, inner plate 254 can include a coating, layer or other surface treatment disposed on or along surface portion 310 thereof, such as is represented in FIG. 7 by dashed line 326, for example.

Figure 18:
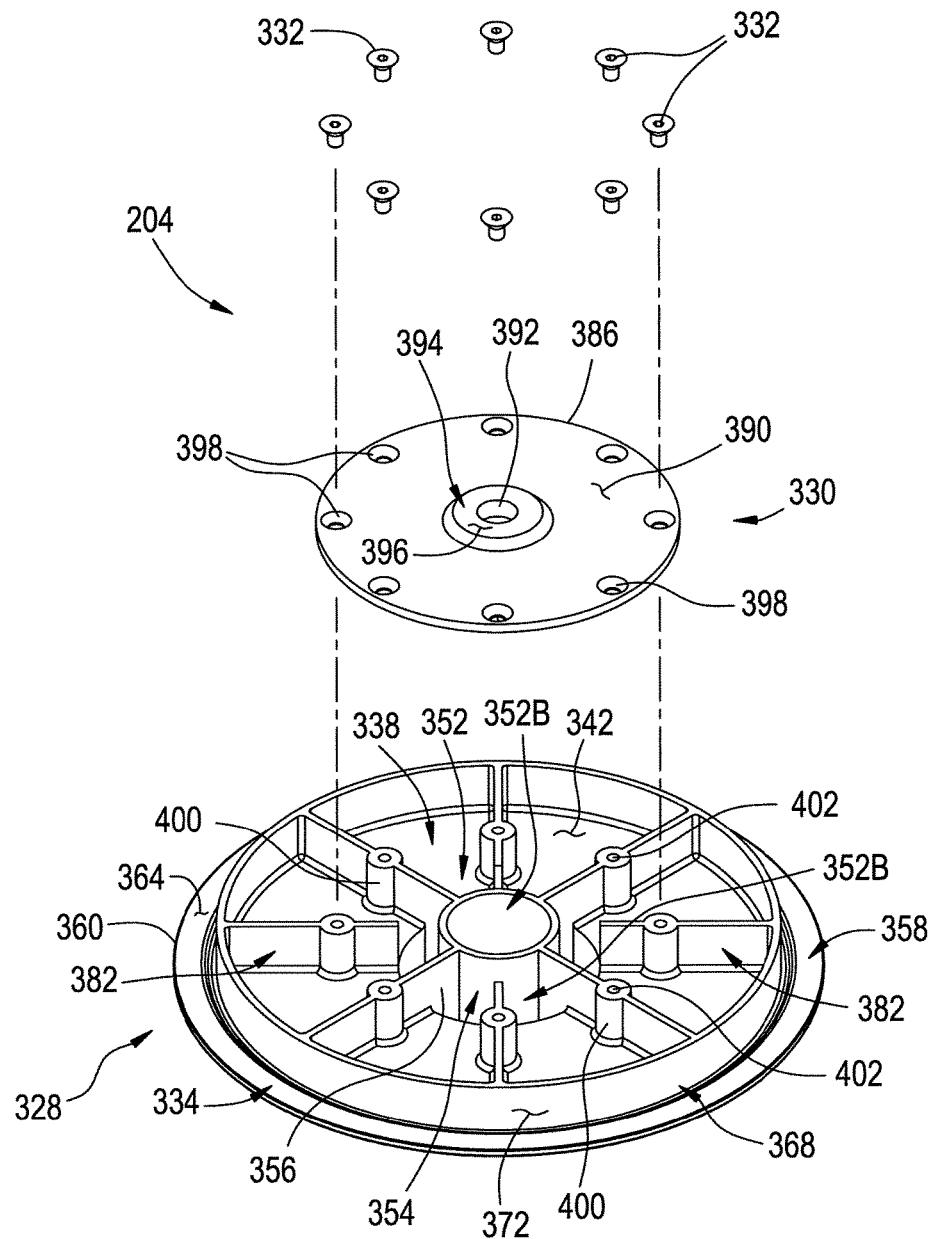
FIG. 18 is an exploded view of another example of an end member assembly in accordance with the subject matter of the present disclosure suitable for use in the exemplary gas spring assembly shown in FIGS. 3-7, 10 and 11.
Figure 19:
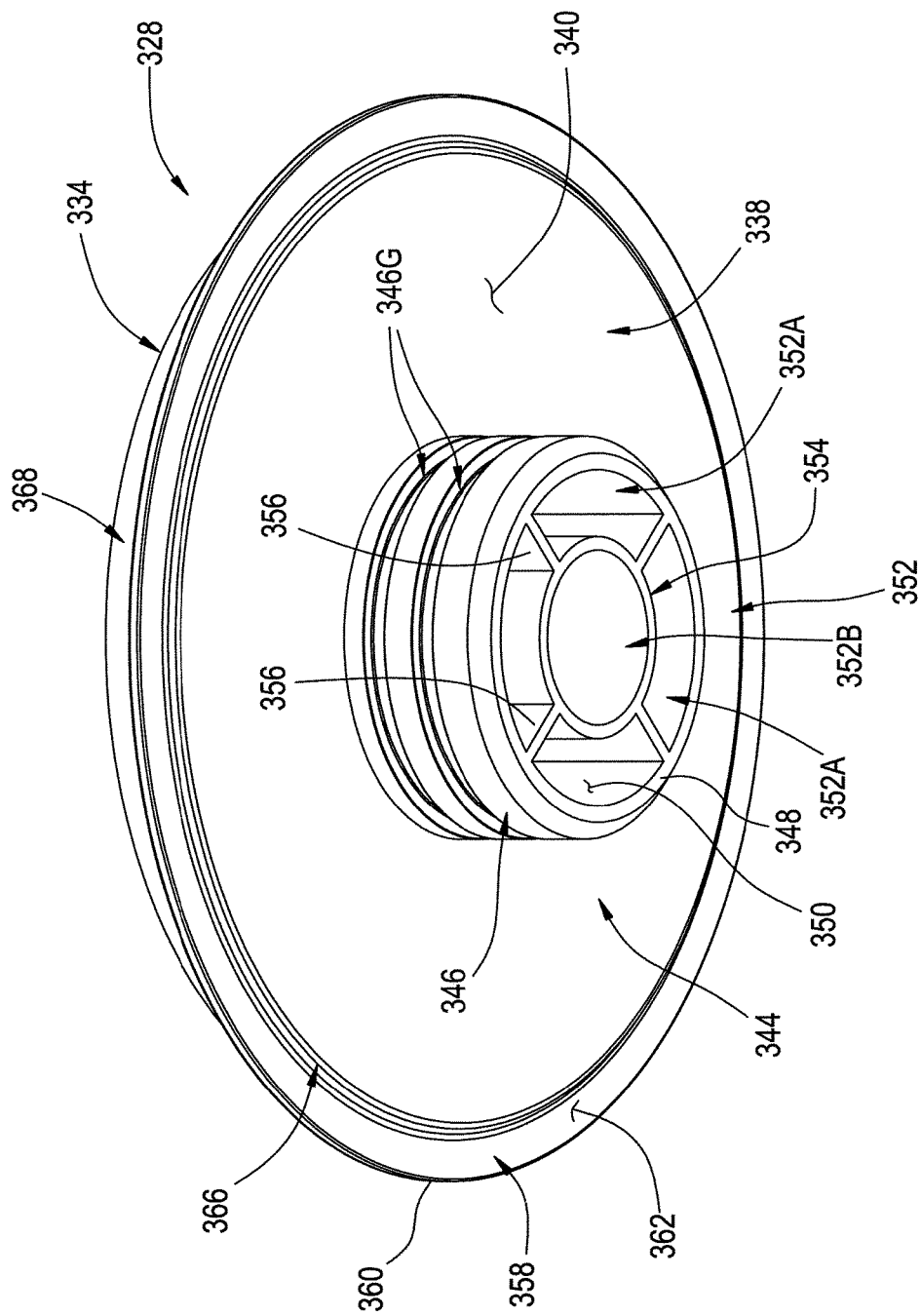
FIG. 19 is a bottom perspective view of another example of an end member in accordance with the subject matter of the present disclosure, such as is shown in FIGS. 4, 5, 7, 10, 11 and 18.
Figure 20:
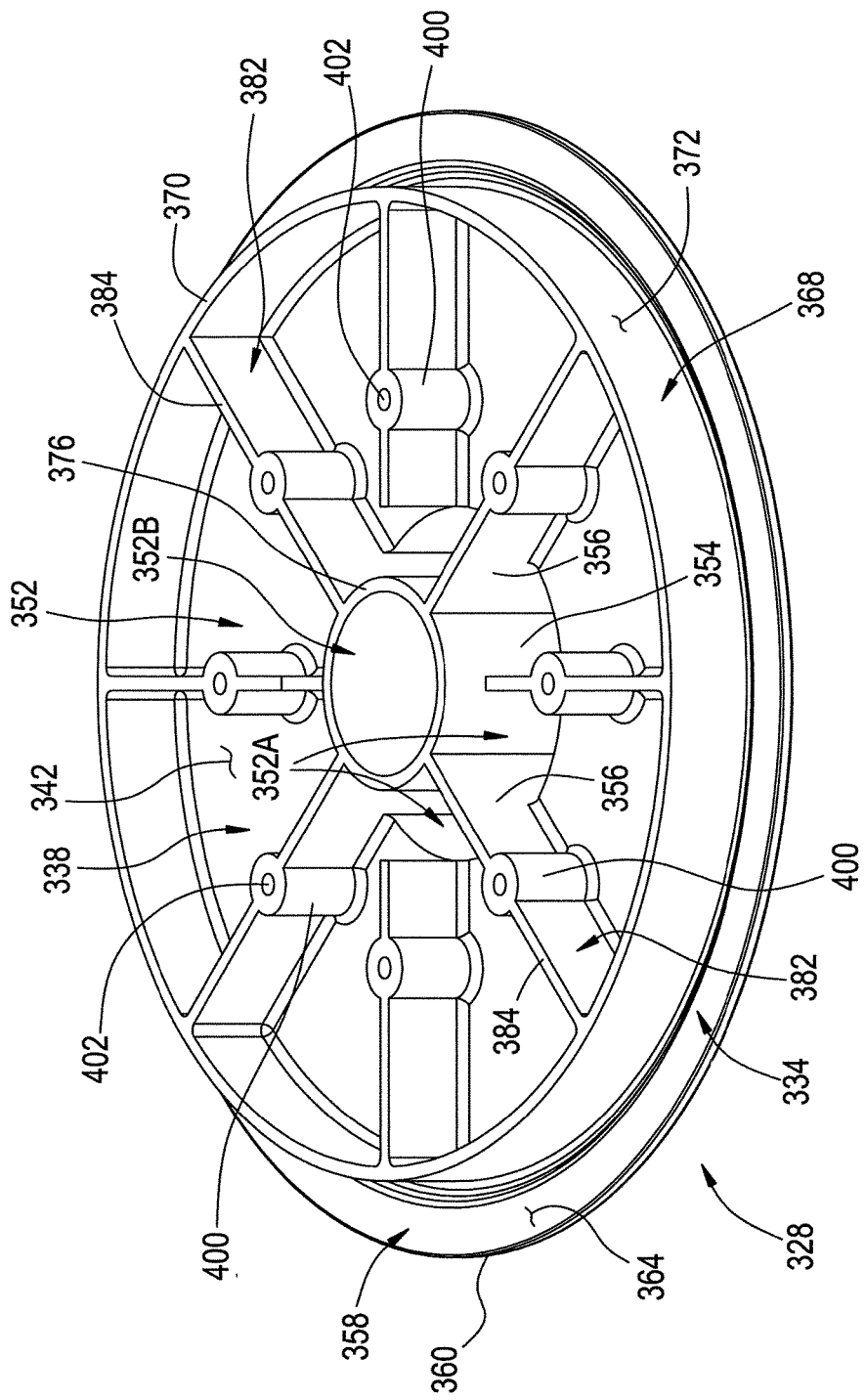
FIG. 20 is a top perspective view of the exemplary end member in FIG. 19.
Figure 21:
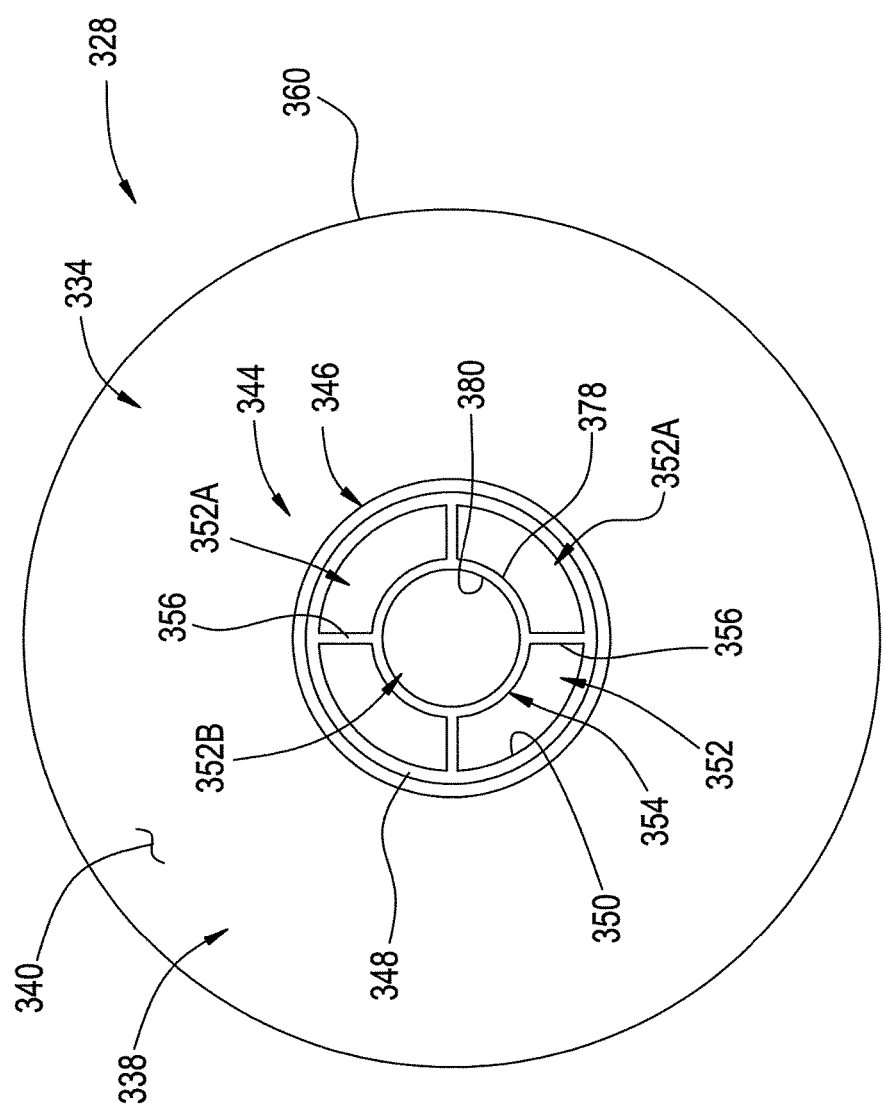
FIG. 21 is a bottom plan view of the exemplary end member in FIGS. 19 and 20.
Figure 22:
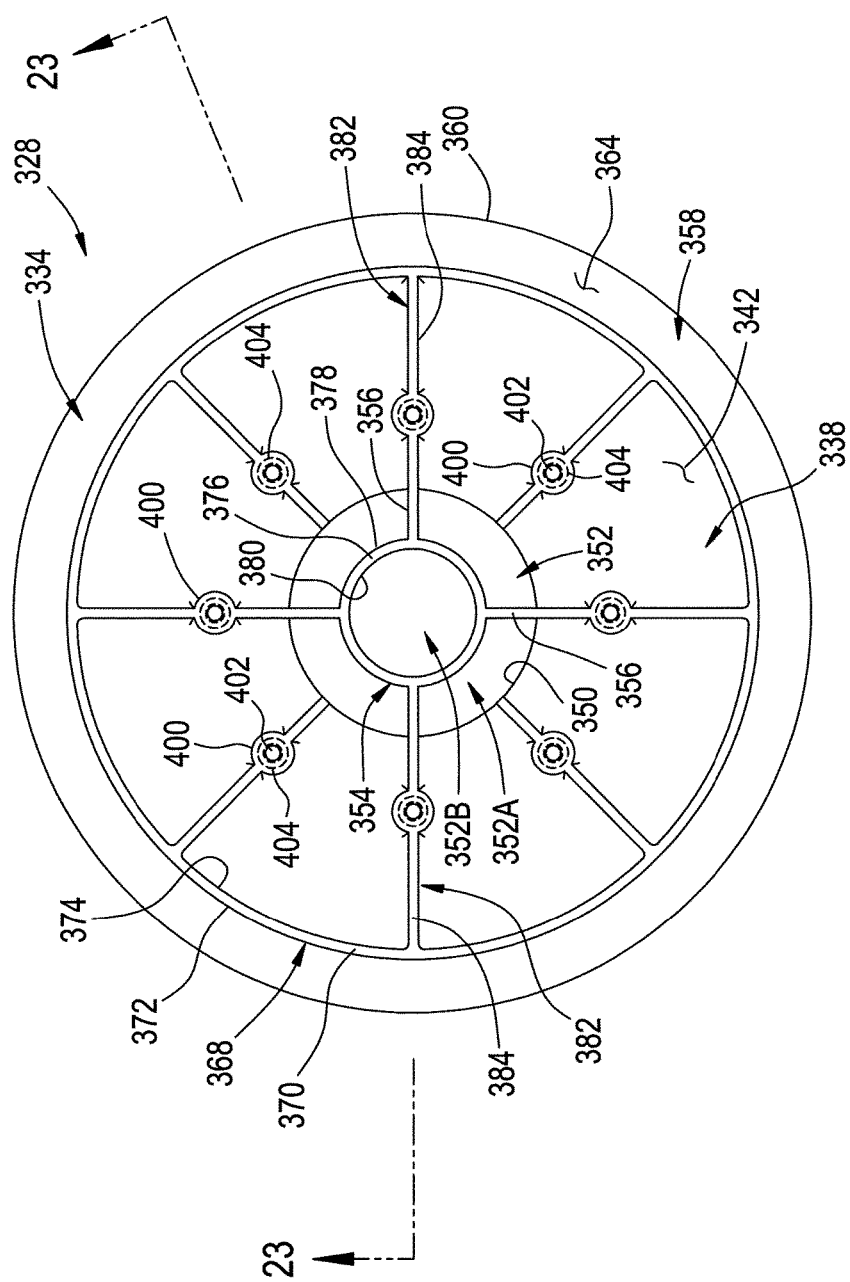
FIG. 22 is a top plan view of the exemplary end member in FIGS. 19-21.
Figure 23:
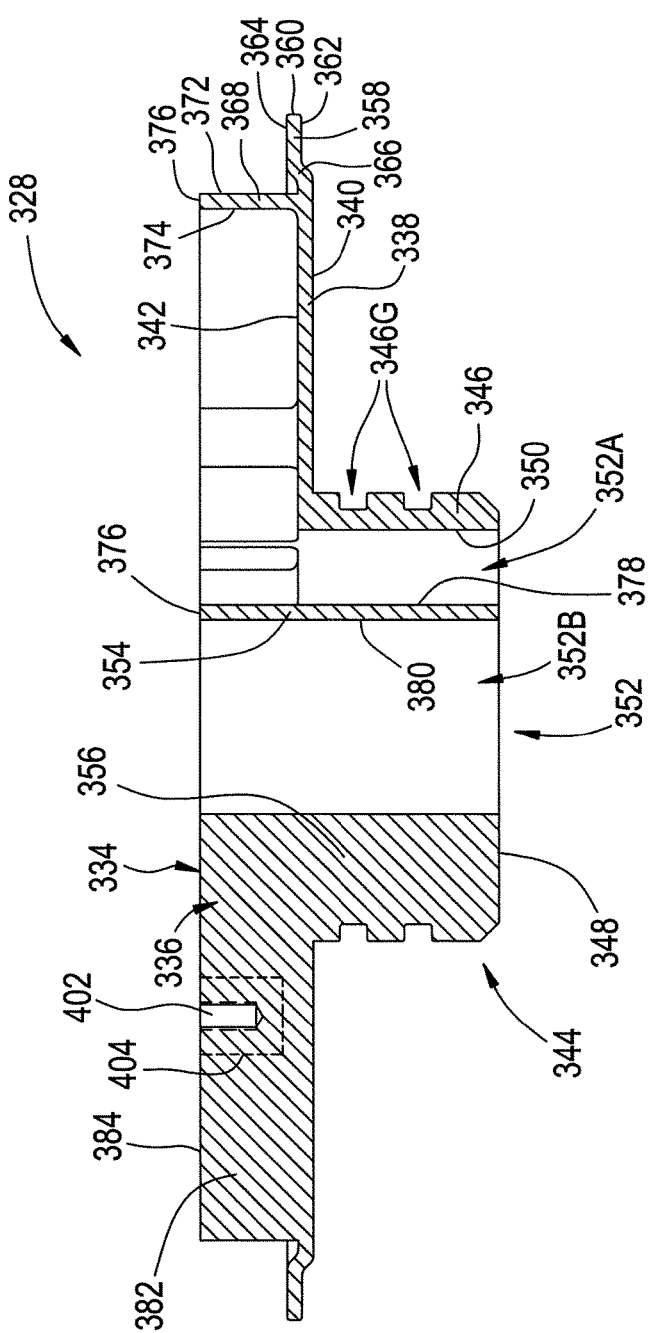
FIG. 23 is a cross-sectional side view of the exemplary end member in FIGS. 19-22 taken from along line 23-23 in FIG. 22.

In the exemplary arrangement in FIGS. 4, 5, 7, 10, 11 and 18-23, end member assembly 204 is shown as including an end member 328 and an inner plate 330 that is supported within spring chamber 208 on or along end member 328 in facing relation to end member 202. Inner plate 330 can be secured on or along end member 328 in any suitable manner, such as by way of one or more securement devices (e.g., threaded fasteners). As shown in FIGS. 7 and 18, for example, a plurality of securement devices 332 can extend between and operatively interconnect the inner plate and the end member. It will be appreciated, however, that other configurations and/or arrangements could alternately be used.

End member 328 can include an end member body 334 that can include any combination of one or more walls and/or one or more wall portions. In a preferred arrangement, an end member body of an end member assembly in accordance with the subject matter of the present disclosure (e.g., end member body 334 of end member assembly 204) can be at least partially formed from one or more polymeric materials, such as by way of one or more processes that permit the features and elements described herein to be integrally formed with other features of the end member assembly. It will be appreciated that the end member and end member body can be formed from any suitable material or combination of materials. For example, end member body 334 can be at least partially formed from a substantially rigid polymeric material, such as a fiber-reinforced polypropylene, a fiber-reinforced polyamide, or an unreinforced (i.e., relatively high-strength) thermoplastic (e.g., polyester, polyethylene, polyamide, polyether or any combination thereof), for example.

End member body 334 includes a body wall 336 that can include an end wall portion 338 oriented transverse to longitudinal axis AX. End wall portion 338 can include a surface portion 340 that can at least partially define a mounting plane MP3 of end member assembly 204. End wall portion 338 can also include a surface portion 342 facing away from surface portion 340 and toward spring chamber 208. In a preferred arrangement, surface portion 342 can be disposed in fluid communication with the spring chamber. End member body 334 can, optionally, include a mounting post 344 projecting axially outward beyond surface portion 340 from along end wall portion 338. Body wall 336 can include a post side wall portion 346 that extends axially outward from along end wall portion 338 toward a distal end 348 of mounting post 344. As discussed above, gas spring assembly 200 can, optionally, include one or more of sealing elements SLE disposed between one of end member assemblies 202 and/or 204 and the associated structural component such that a substantially fluid-tight seal is formed therebetween. If provided, it will be appreciated that the one of more sealing elements can be retained on or along the end member assembly in any suitable manner. As one example, one or more radially inwardly-extending annular grooves 346G could be formed on or along post side wall portion 346 of projection 344, and can be dimensioned to at least partially receive one of sealing elements SLE. In some cases, structural component SC2 can, optionally, at least partially define an external reservoir suitable for storing a quantity of pressurized gas.

In a preferred arrangement, mounting post 344 can include a surface portion 350 that at least partially defines a passage 352 extending through mounting post 344 and into fluid communication with spring chamber 208. In this manner, pressurized gas can be transferred into and out of spring chamber 208 through passage 352. In some cases, body wall 336 can include an inner post wall portion 354 that can extend along passage 352. Inner post wall portion 354 can be spaced radially inward of inner surface portion 350 such that passage 352 is at least partially separated into outer and inner passage portions 352A and 352B. In some cases, body wall 336 can include at least one post connecting wall portion 356 that can extend between and operatively connect post side wall portion 346 and inner post wall portion 354. If included, a plurality of connecting wall portions 356 can be disposed in peripherally spaced relation from one another about longitudinal axis AX. In which case, outer passage portion 352A can be at least partially separated into a plurality of discrete passage portions (not individually numbered) that are disposed adjacent one another about longitudinal axis AX. In an assembled condition, the discrete passage portions of outer passage portion 352A are disposed in fluid communication with spring chamber 208 such that pressurized gas can be transferred into and out of the spring chamber through at least outer passage portion 352A. In some cases, inner plate 330 can extend across and at least partially form a closed end of inner passage portion 352B such that the inner passage portion is at least partially fluidically isolated from spring chamber 208 by inner plate 330. It will be appreciated, however, that other configurations and/or arrangements could alternately be used.

Body wall 336 can also include an outer peripheral wall portion 358 that is disposed radially outward of end wall portion 338. Outer peripheral wall portion 358 can extend radially outward to an outer peripheral edge 360 that can at least partially define an outermost periphery of end member 328. Outer peripheral wall portion 358 is shown as being axially offset from end wall portion 338 in a direction away from mounting plane MP3. Outer peripheral wall portion 358 includes a surface portion 362 disposed in facing relation to mounting plane MP3 and a surface portion 364 facing opposite surface portion 362 and generally away from the mounting plane. A connecting wall portion 366 extends between and operatively connects end wall portion 338 and outer peripheral wall portion 358. In a preferred arrangement, at least outer peripheral wall portion 358 and connecting wall portion 366 can extend annularly about longitudinal axis AX such that end wall portion 338 and end member 328 can have an approximately circular overall shape and configuration.

Body wall 336 can further include an outer side wall portion 368 that extends from along surface portion 364 of end wall portion 338 axially toward a distal edge 370. Outer side wall portion 368 can include a surface portion 372 facing radially outward and a surface portion 374 facing radially inward opposite surface portion 372. In a preferred arrangement, outer side wall portion 368 is spaced radially inward from outer peripheral wall portion 358 such that connecting wall portion 366 is disposed therebetween. In a preferred arrangement, inner post wall portion 354 can extend axially beyond surface portion 342 of end wall portion 338 toward a distal edge 376. Inner post wall portion 354 can include a surface portion 378 facing radially outward toward surface portions 350 and 374 of mounting post 344 and outer side wall portion 368, respectively. Inner post wall portion 354 can also include a surface portion 380 facing radially inward opposite surface portion 378.

One or more of distal edges 370 and 376 can at least partially define a mounting plane MP4 of end member 328 along which inner plate 330 can, in some cases, be disposed or otherwise at least partially supported in a suitable manner. In a preferred arrangement, distal edges 370 and 376 can be disposed in approximate alignment with one another. Body wall 336 can, optionally, include one or more support wall portions that can extend between and operatively interconnect inner post wall portion 354 and outer side wall portions 368. In a preferred arrangement, a plurality of support wall portions 382 can be disposed in spaced relation to one another about longitudinal axis AX. If provided, support wall portions 382 can extend radially between and operatively interconnect inner post wall portion 354 and outer side wall portions 368, as discussed above. Additionally, support wall portions 382 can extend from along surface portion 342 of end wall portion 338 axially toward distal edges 384. In a preferred construction, distal edges 384 can be disposed in at least approximate alignment with one or more of distal edges 370 and/or 376. As such, in some cases, distal edges 384 can at least partially define mounting plane MP4.

End member assembly 204 is shown and described herein as including inner plate 330, which can be of any suitable size, shape, configuration and/or construction. In the arrangement shown in FIGS. 7 and 18, inner plate 330 is shown as including a plate wall (not numbered) that extends radially outward to an outer peripheral edge 386. Inner plate 330 can also include a surface portion 388, a surface portion 390 facing opposite surface portion 388 and an inner edge 392 that at least partially defines an opening or passage (not numbered) extending through the plate wall of inner plate 330. In some cases, the plate wall of inner plate 330 can include a boss wall portion 394 that is disposed radially inward of outer peripheral edge 386 adjacent inner edge 392. Boss wall portion 394 can project axially outward beyond surface portion 390 and at least partially define a boss surface portion 396.

As indicated above, inner plate 330 can be secured on or along end member body 334 of end member 328 in any suitable manner. As one example, inner plate 330 can include one or more openings or holes 398 extending through the plate wall that are dimensioned to receive one of securement devices 332, such as threaded fasteners, for example. As shown in FIG. 18, a plurality of holes 398 can be included that are disposed in spaced relation to one another about longitudinal axis AX. In which case, securement devices 332 can extend through a corresponding one of holes 398 into operative engagement with end member body 334.

It will be appreciated that securement devices 332 can operatively engage any suitable features and/or components of end member 328. As one example, the securement devices can threadably engage corresponding threaded holes formed within the support wall portions that extend between and operatively interconnect the outer and inner wall portions of the end member body. As another example, body wall 336 can include a plurality of mounting bosses or mounting boss wall portions 400 that can extend from along surface portion 342 of end wall portion 338 axially toward mounting plane MP4. In a preferred construction, mounting boss wall portions 400 can, optionally, be disposed along support wall portions 382 with mounting boss wall portions 400 at least partially defining distal edges 384 and disposed in approximate alignment with mounting plane MP4. In such case, inner plate 330 can be supported on end member 328 such that surface portion 388 is disposed in abutting engagement along distal edges 384 of support wall portions 382 and/or mounting boss wall portions 400 with surface portion 390 facing toward end member assembly 202. Additionally, a suitable securement feature 402, such as a threaded hole, for example, can be provided on or along support wall portions 382 and/or mounting boss wall portions 400, if provided. In some cases, such a threaded hole or other securement feature can be formed directly into the material of end member body 334. In other cases, a plurality of inserts 404 or other securement elements can be at least partially embedded within support wall portions 382 and/or mounting boss wall portions 400 that are dimensioned to operatively engage securement devices 332. It will be appreciated, however, that other configurations and/or arrangements could alternately be used.

It will be appreciated that inner plate 330 can be formed from any suitable material or combination of materials, such as one or more metal (e.g., steel, aluminum) and/or one or more polymeric materials (e.g., fiber reinforced polymeric materials, such as glass or other fiber-reinforced polypropylene and glass or other fiber-reinforced polyamide, and high-strength (e.g., unfilled) polymeric materials, such as polyester, polyethylene, polypropylene or other polyether-based materials).

As discussed above, in preferred constructions, gas spring assembly in accordance with the subject matter of the present disclosure, such as gas spring assembly 200, for example, can include an internal support structure or device that may be suitable for inhibiting contact between certain components and/or features of the gas spring assembly and/or the associated suspension system. Additionally, or in the alternative, the internal support structure or device may be constructed for use in supporting a vehicle body at a predetermined height during uninflated, under-inflated or other conditions of use of the gas spring assemblies. It will be appreciated that such an internal support structure can be of any suitable type, kind, configuration and/or construction.

One example of such as construction is shown in FIG. 7 in the form of a support element 406 that is supported on inner plate 330 in spaced relation to inner plate 254. It will be appreciated, however, that the arrangement shown in FIG. 7 is merely exemplary and that other configurations and/or arrangements could alternately be used. Additionally, it will be appreciated that support element 406 can be of any suitable size, shape, construction and/or configuration that may be suitable for inhibiting contact between certain components and/or features of the gas spring assembly and/or the associated suspension system, and/or for supporting a vehicle body at a predetermined height during uninflated, under-inflated or other conditions of use of the gas spring assembly.

For example, support element 406 can include an element body 408 that includes an end surface portion 410 dimensioned to abuttingly engage surface portion 310 of inner plate 254. Support element 406 can also include an end surface portion 412 dimensioned to abuttingly engage at least surface portion 390 of inner plate 330. In a preferred arrangement, end surface portion 412 can be contoured or otherwise configured in a manner complimentary to surface portion 390 and boss surface portion 396 of inner plate 330. It will be appreciated that support element 406 can be secured on or along end member assembly 204 in any suitable manner. For example, a mounting element 414 can be operatively connected to inner plate 330, and can be dimensioned to receivingly engage support element 406 for retention on or along inner plate 330 of end member assembly 204. It will be appreciated that mounting element 414 can be secured on or along inner plate 330 in any suitable manner. As one example, inner edge 392 can at least partially define an opening or passage (not numbered) extending through the plate wall of inner plate 330, as discussed above. A portion (not numbered) of mounting element 414 can extend through the opening formed by inner edge 392, and the mounting element can be operatively connected to the plate wall of inner plate 330 in a suitable manner. For example, the mounting element could be secured on or along the plate wall of inner plate 330 by way of a threaded connection. As another example, mounting element 414 is shown in FIG. 7 as being secured on or along the plate wall of inner plate 330 by way of a flowed-material joint 416, which can, in a preferred arrangement, operatively connect the mounting element and the inner plate such that a substantially fluid-tight seal is formed therebetween. Element body 408 can include an opening or passage (not numbered) extending thereinto such as from along end surface portion 412, for example, that is dimensioned to receivingly engage at least a portion of mounting element 414 in a manner suitable for retaining support element 406 on or along end member 204. It will be appreciated, however, that other configurations and/or arrangements could alternately be used.

End member assemblies 202 and 204 can be respectively secured on or along ends 210 and 212 of flexible spring member 206 in any suitable manner. In a preferred arrangement, end surface portion 238 of mounting bead 234 can be disposed in abutting engagement with surface portion 282 of outer peripheral wall portion 276 of end member 252. And, in a preferred arrangement, end surface portion 238 of mounting bead 236 can be disposed in abutting engagement with surface portion 364 of outer peripheral wall portion 358. It will be appreciated that mounting beads 234 and 236 can be respectively secured on or along outer peripheral wall portions 276 and 358 of end members 258 and 328 in any suitable manner. As one example, a retaining ring can compressively capture at least one of mounting beads 234 and 236, respectively, on or along a corresponding one of outer peripheral wall portions 276 and 358 of end members 258 and 328. In the arrangement shown in FIGS. 3-11, a retaining ring 418 can operatively connect mounting bead 234 and outer peripheral wall portion 276 of end member 258. Additionally, or in the alternative, a retaining ring 420 can operatively connect mounting bead 236 and outer peripheral wall portion 358 of end member 328.

It will be appreciated that retaining rings of any suitable size, shape, configuration and/or arrangement, and can include any number of one or more walls and/or wall portions. In cases in which two retaining rings are included, it will also be appreciated that the two retaining rings can differ in size, shape, configuration and/or arrangement. In other cases, such as is shown in FIGS. 3-11, for example, retaining rings 418 and 420 can be substantially similar to one another. In any case, the retaining rings can take the form of endless, annular rings that extend peripherally about longitudinal axis AX. For example, retaining rings 418 and 420 can include a ring wall 422 that extends between edges 424 and 426. Retaining rings 418 and 420 can also include a surface portion 428 extending between edges 424 and 426 that faces generally inward as well as a surface portion 430 extending between edges 424 and 426 that faces generally outward in a direction away from or otherwise generally opposite surface portion 428. Ring wall 422 of retaining rings 418 and 420 is shown as having a cross-sectional profile or shape that includes an end or flange wall portion 432 disposed along edge 424, an outer side wall portion 434 and a bead-engagement wall portion 436 disposed along edge 426.

In an assembled condition, flange wall portion 432 is shown as being oriented transverse to longitudinal axis AX and extends radially inward toward edge 424. Outer side wall portion 434 extends in a generally axial direction from along flange wall portion 432. Outer side wall portion 434 is disposed radially outward of outer peripheral edge 278 or 360, and can, in some cases, at least partially define an outer peripheral extent of retaining rings 418 and/or 420. Bead-engagement wall portion 436 can extend radially inward from along outer side wall portion 434 to edge 426 and in an orientation that is generally transverse to longitudinal axis AX. In a preferred arrangement, bead-engagement wall portion 436 can be crimped or otherwise deformed from a substantially cylindrical configuration into a curved or other non-linear cross-sectional shape that abuttingly engages at least a portion of one of mounting beads 234 and/or 236. In a preferred arrangement, flange wall portion 432 has a thickness dimension that is less than or equal to the offset distance between surface portions 264 and 280 and/or the offset distance between surface portions 340 and 362. In this manner, surface 430 along flange wall portion 432 can be disposed in approximate alignment with or recessed from the corresponding one of mounting planes MP1 and MP3.

Figure 9:
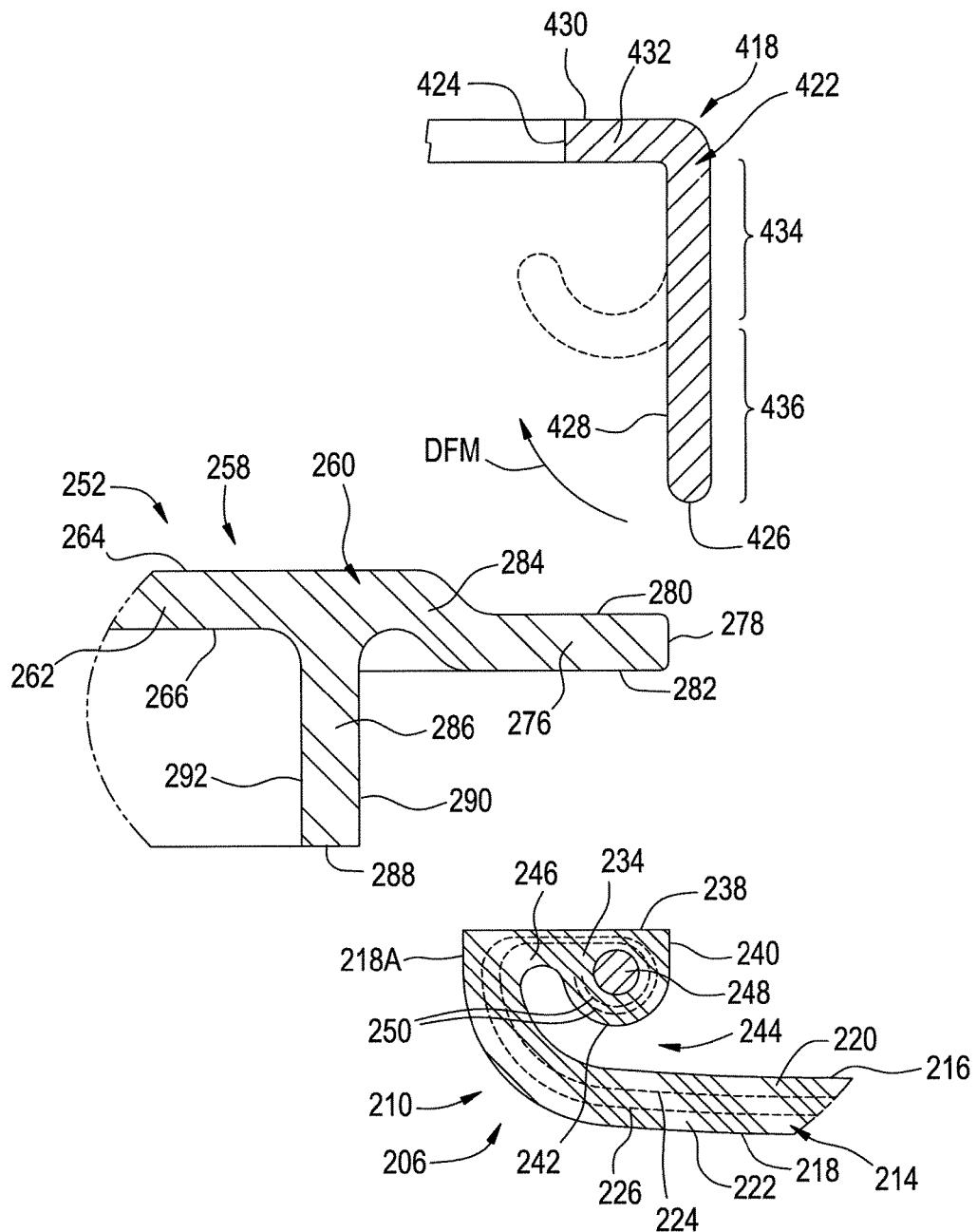
FIG. 9 is an exploded view of the portion of the exemplary gas spring assembly in FIG. 8 shown prior to assembly.
Figure 10:
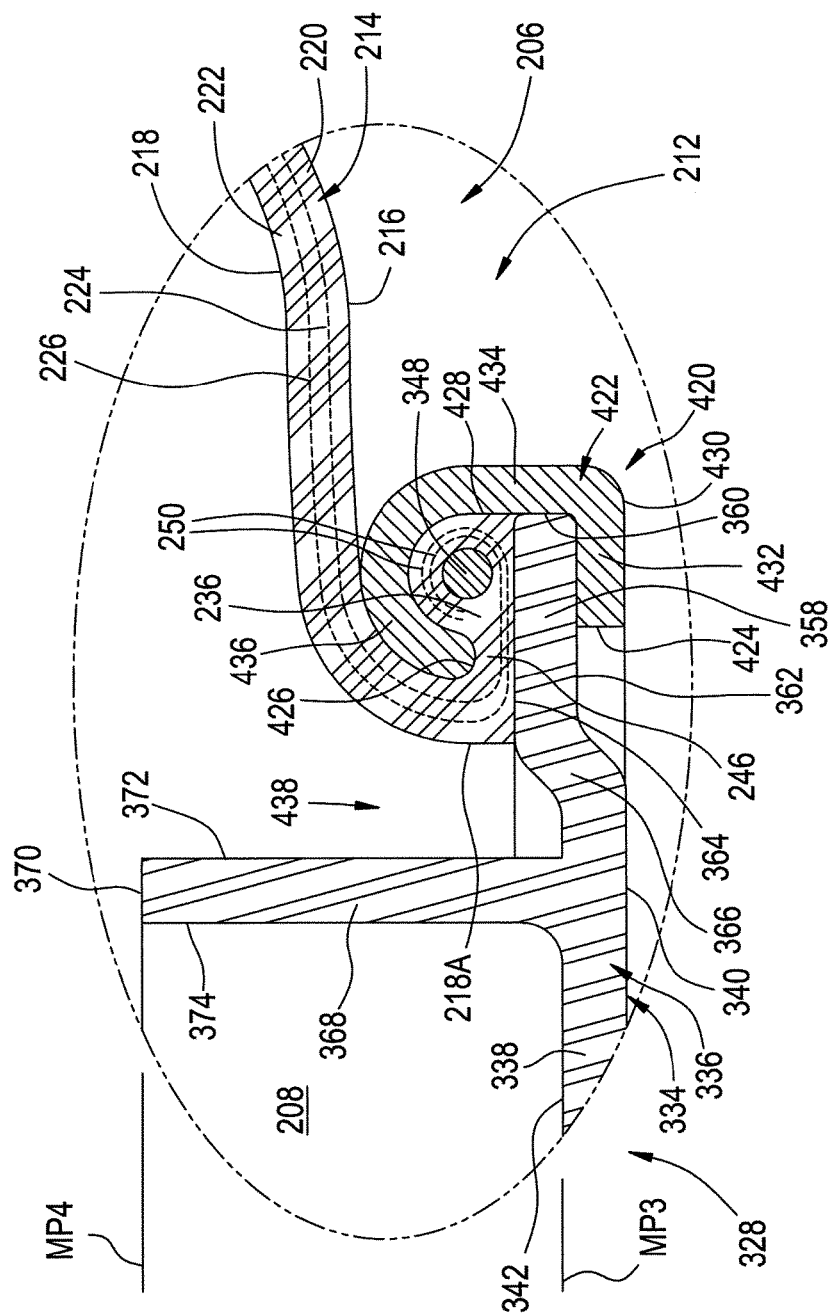
FIG. 10 is an enlarged view of the portion of the exemplary gas spring assembly in FIGS. 3-7 identified as Detail 10 in FIG. 7.
Figure 11:
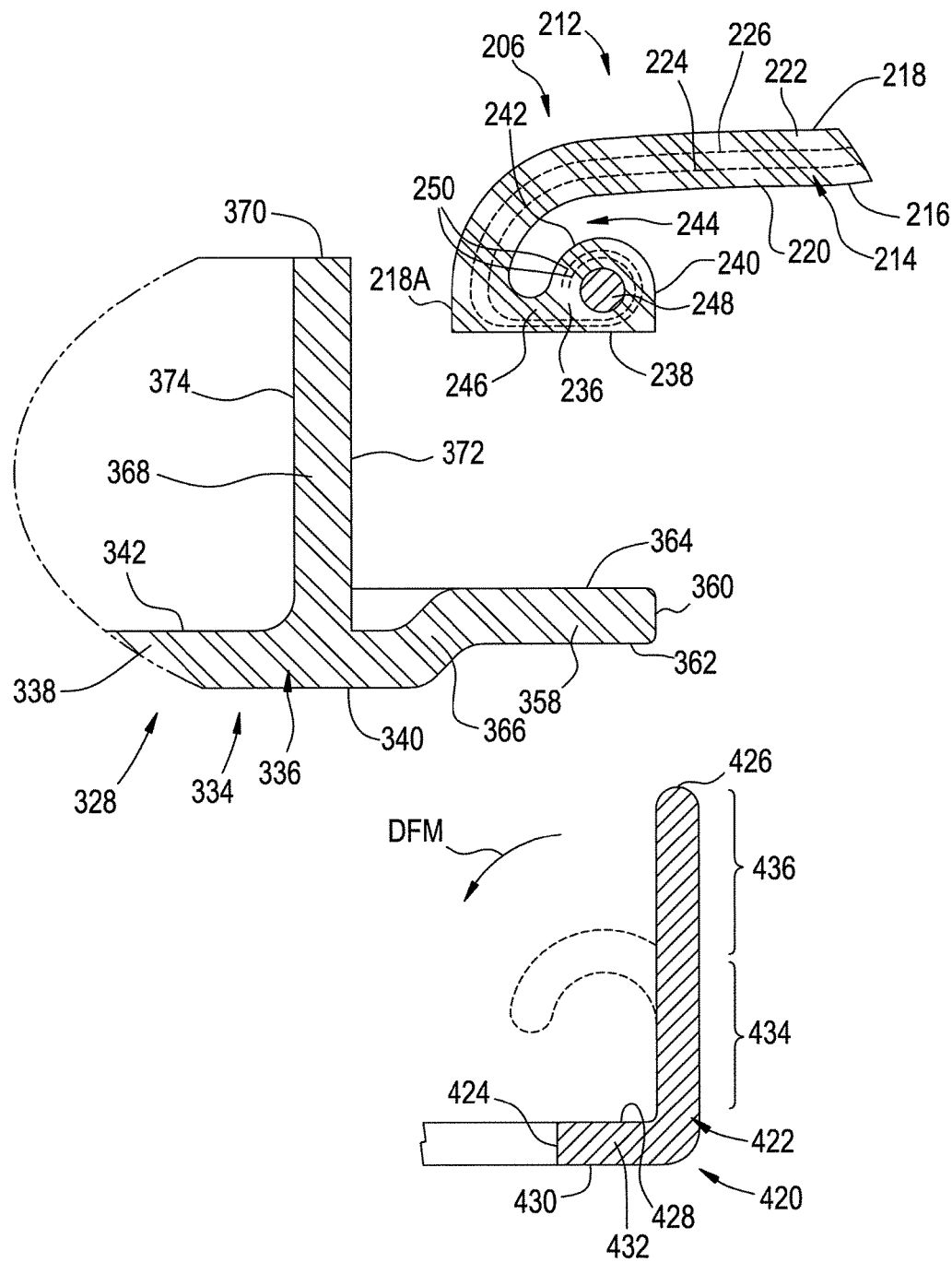
FIG. 11 is an exploded view of the portion of the exemplary gas spring assembly in FIG. 10 shown prior to assembly.

During assembly, one or more of end members 252 and/or 328 can be provided, whether alone or as part of one of end member assemblies 202 and/or 204. One of retaining rings 418 and/or 420 can be provided with bead-engagement wall portion 436 disposed in approximate alignment with outer side wall portion 434 such that an approximately cylindrical wall section is formed therealong, such as is illustrated in FIGS. 9 and 11, for example. The retaining ring can be positioned along the end member such that flange wall portion 432 thereof is disposed along outer peripheral wall portion 276 or 358 with outer side wall portion 434 disposed radially outward of outer peripheral edge 278 or 360. A corresponding one of mounting beads 234 and 236 of flexible spring member 206 can be positioned along the outer side wall portion such that a portion 218A of inner surface 218 that is disposed adjacent mounting beads 234 and/or 236 is disposed radially outward of a corresponding one of surfaces 290 and 372 of outer side wall portions 286 and/or 368. In this manner, an annular space or gap 438 is formed therebetween, as is identified in FIGS. 7, 8 and 10.

As assembly continues, bead-engagement wall portion 436 of retaining rings 418 and/or 420 can be controllably deformed (e.g., crimped, swaged, pressed) into abutting engagement with flexible spring member 206 such that a corresponding one of mounting beads 234 and 236 is at least partially captured by the bead-engagement wall portion to form a crimped-edge connection with the corresponding end member, such as is represented by arrows DFM in FIGS. 9 and 11. In this manner, bead-engagement wall portion 436 can extend into and/or along groove 244 and abuttingly engage outer bead surface portion 242 of the corresponding mounting bead, and compress end surface portion 238 into sealing engagement with the corresponding one of surfaces 282 and 364 of the end member, such that a substantially fluid-tight seal is formed therebetween.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. A gas spring assembly comprising:
a flexible spring member having a longitudinal axis and extending longitudinally between first and second open ends, said flexible spring member including a flexible wall extending peripherally about said longitudinal axis to at least partially define a spring chamber between said first and second open ends with a first mounting bead disposed along said first open end, said first mounting bead including an inner side surface portion extending annularly about said longitudinal axis and a first end surface portion oriented transverse to said longitudinal axis;
a first end member including an end member body formed substantially entirely from a polymeric material, said end member body including a body wall with:
an end wall portion oriented transverse to said longitudinal axis;
an outer peripheral wall portion disposed radially outward of said end wall portion and at least partially defining an outer peripheral edge of said first end member; and,
an outer side wall portion extending from along said end wall portion to an outer distal edge disposed in fluid communication with said spring chamber, said outer side wall portion disposed radially inward of said outer peripheral edge and including an outer side surface portion facing radially outward;
said end wall portion at least partially defining a mounting plane of said first end member dimensioned to abuttingly engage an associated structural component, and said outer peripheral wall portion axially offset from said end wall portion in a direction away from said mounting plane and toward said outer distal edge;
said first end member secured across said first open end of said flexible spring member such that a substantially fluid tight seal is formed therebetween with said inner side surface portion of said first mounting bead disposed radially outward of said outer side surface portion of said outer side wall portion and with said inner side surface portion of said first mounting bead extending axially co-extensively along said outer side surface portion of said outer side wall portion such that an annular gap is formed therebetween.

2. A gas spring assembly according to claim 1, wherein said body wall includes an inner side wall portion disposed radially inward of said outer side wall portion.

3. A gas spring assembly according to claim 1, wherein said body wall includes a post side wall portion that projects outward from along said end wall portion in a direction opposite said outer distal edge and at least partially defines a mounting post.

4. A gas spring assembly according to claim 1, wherein said outer peripheral wall portion includes a first surface portion facing axially outward toward said mounting plane and a second surface portion facing axially inward toward said second open end of said flexible spring member.

5. A gas spring assembly according to claim 4, wherein said first end surface portion of said first mounting bead is disposed in abutting engagement with said second surface portion of said outer peripheral wall portion.

6. A gas spring assembly according to claim 1, wherein said first mounting bead includes a reinforcing element at least partially embedded therein.

7. A gas spring assembly according to claim 1, wherein said first mounting bead includes a first bead outer surface portion facing opposite said first end surface portion.

8. A gas spring assembly according to claim 1 further comprising a second end member extending across said second open end of said flexible spring member and operatively connected thereto such that a substantially fluid-tight seal is formed therebetween.

9. A gas spring assembly according to claim 1 further comprising a retaining element operatively connecting said first open end of said flexible spring member to said outer peripheral wall portion of said body wall.

10. A gas spring assembly according to claim 9, wherein said retaining element includes an element wall with a side wall portion extending around said outer peripheral wall portion of said first end member radially outward of said outer peripheral edge.

11. A gas spring assembly according to claim 9, wherein said retaining element includes an element wall with a flange wall portion extending transverse to said longitudinal axis along said outer peripheral wall portion of said first end member.

12. A gas spring assembly according to claim 9, wherein said retaining element includes an element wall with a bead-engagement wall portion abuttingly engaging said first mounting bead into a substantially fluid-tight connection along said outer peripheral wall portion of said first end member.

13. A gas spring assembly according to claim 1, wherein said body wall includes a connecting wall portion extending between and operatively connecting said end wall portion and said outer peripheral wall portion.

14. A gas spring assembly according to claim 13, wherein said outer side wall portion is disposed radially inward of said connecting wall portion.

15. A gas spring assembly according to claim 2, wherein said inner side wall portion extends from along said end wall portion in a direction away from said mounting plane toward an inner distal edge.

16. A gas spring assembly according to claim 1, wherein said body wall includes a plurality of support wall portions extending from along said end wall portion in a direction away from said mounting plane, said plurality of support wall portions oriented radially along said end wall portion and disposed in spaced relation to one another about said longitudinal axis.

17. A gas spring assembly according to claim 1, wherein said body wall includes an inner side wall portion disposed radially inward of said outer side wall portion, and said plurality of support wall portions are operatively connected with at least one of said outer side wall portion and said inner side wall portion.

18. A gas spring assembly according to claim 1 further comprising an inner plate supported along said body in spaced relation to said mounting plane.

19. A gas spring assembly comprising:
a flexible spring member having a longitudinal axis and extending longitudinally between first and second open ends, said flexible spring member including a flexible wall extending peripherally about said longitudinal axis to at least partially define a spring chamber between said first and second open ends with a first mounting bead disposed along said first open end, said first mounting bead including an inner side surface portion extending annularly about said longitudinal axis and a first end surface portion oriented transverse to said longitudinal axis;

a first end member including an end member body formed substantially entirely from a polymeric material, said end member body including:
  an end wall portion oriented transverse to said longitudinal axis;
  an outer peripheral wall portion disposed radially outward of said end wall portion and at least partially defining an outer peripheral edge of said first end member; and,
  an outer side wall portion extending from along said end wall portion to an outer distal edge, said outer side wall portion disposed radially inward of said outer peripheral edge and including an outer side surface portion facing radially outward;
  said end wall portion at least partially defining a mounting plane of said first end member dimensioned to abuttingly engage an associated structural component, and said outer peripheral wall portion axially offset from said end wall portion in a direction away from said mounting plane and toward said outer distal edge;
  said first mounting bead positioned along said outer peripheral wall portion such that said inner side surface portion of said first mounting bead is disposed radially outward of said outer side surface portion of said outer side wall portion forming an annular gap therebetween through which an annular area of said end wall portion is exposed to said spring chamber; and,
a retaining element operatively connecting said first open end of said flexible spring member to said outer peripheral wall portion of said first end member, said retaining element including an element wall with:
  a side wall portion extending around said outer peripheral wall portion of said first end member radially outward of said outer peripheral edge;
  a flange wall portion extending transverse to said longitudinal axis along said outer peripheral wall portion of said first end member; and,
  a bead-engagement wall portion abuttingly engaging said first mounting bead into a substantially fluid-tight connection along said outer peripheral wall portion of said first end member.

20. A gas spring assembly according to claim 19, wherein said flange wall portion is disposed in approximate alignment with said end wall portion along said mounting plane.

* * * * *